(12) United States Patent
Saendig

(10) Patent No.: US 7,714,273 B2
(45) Date of Patent: May 11, 2010

(54) POSITION-MEASURING DEVICE

(75) Inventor: Karsten Saendig, Palling (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 346 days.

(21) Appl. No.: 11/942,435

(22) Filed: Nov. 19, 2007

(65) Prior Publication Data
US 2008/0117440 A1 May 22, 2008

(30) Foreign Application Priority Data

Nov. 20, 2006 (DE) .................. 10 2006 054 780
Jul. 27, 2007 (DE) .................. 10 2007 035 345

(51) Int. Cl.
*G01D 5/34* (2006.01)
(52) U.S. Cl. ............................ 250/231.13; 250/231.17; 356/616; 341/13; 33/707
(58) Field of Classification Search ............ 250/231.13, 250/231.14, 231.17, 231.18, 237 G, 234; 356/616, 617; 341/9, 13; 33/1 PT, 706, 33/707
See application file for complete search history.

(56) References Cited
U.S. PATENT DOCUMENTS
5,073,710 A 12/1991 Takagi et al.
5,981,941 A 11/1999 Takata et al.
2008/0067333 A1* 3/2008 Holzapfel et al. ........... 250/234
2008/0315076 A1* 12/2008 Kusano ................... 250/231.1

* cited by examiner

*Primary Examiner*—Kevin Pyo
(74) *Attorney, Agent, or Firm*—Kenyon & Kenyon LLP

(57) ABSTRACT

A position-measuring device for generating a reference-pulse signal at at least one reference position includes a scanning unit and also a reflection-measuring graduation displaceable relative thereto in at least one measuring direction. The scanning unit for generating the reference-pulse signal includes a plurality of optical elements, including at least one imaging optics as well as at least two diaphragm structures, which are disposed in a diaphragm plane and have a plurality of diaphragm openings in each case. Furthermore, a light source as well as at least two detector elements are assigned to the scanning unit. The reflection-measuring graduation has a reference marking at the at least one reference position. It includes at least one set of first structure elements, which is arranged in the plane of the reflection-measuring graduation, perpendicular to the measuring direction, periodically at a first transversal periodicity. Furthermore, the reference marking has at least one set of second structure elements, which is arranged in the plane of the reflection-measuring graduation, perpendicular to the measuring direction, periodically at a second, different transversal periodicity. The structure elements are arranged as diffractive structure elements, which, in the measuring direction, optically act like a cylinder lens having a specific focal length and, perpendicular to the measuring direction, act like a deflecting grating having the graduation period.

22 Claims, 24 Drawing Sheets

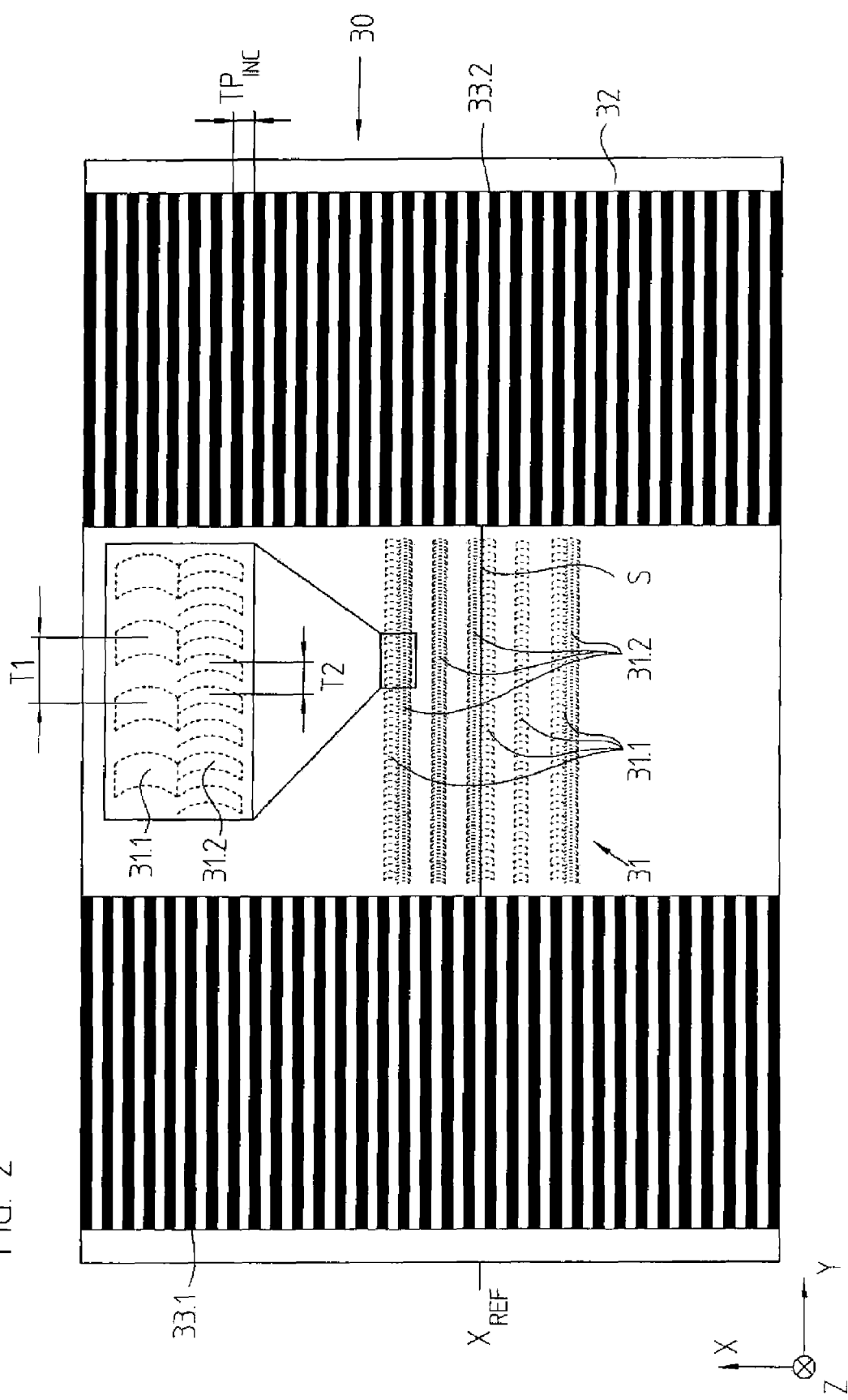

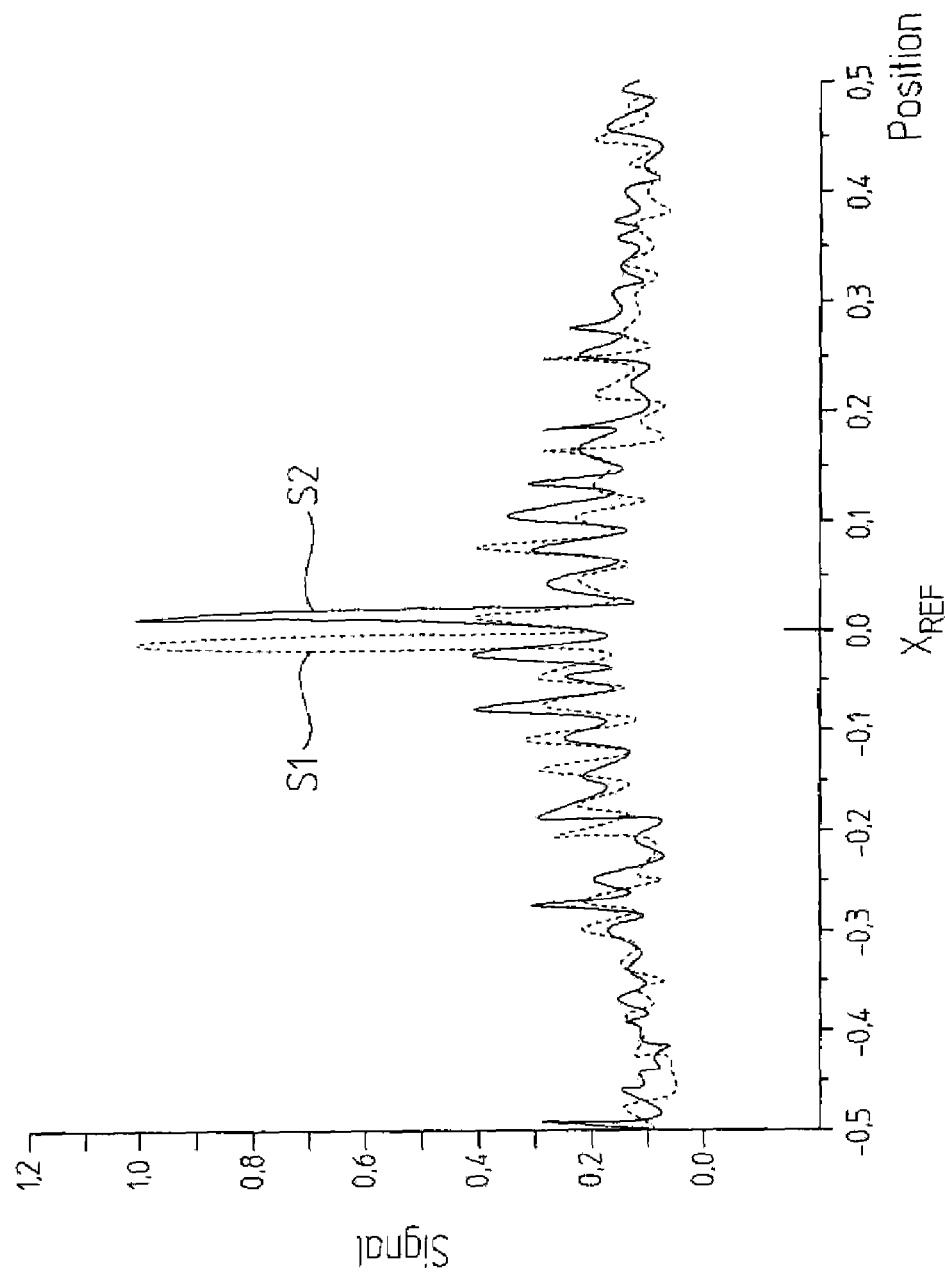

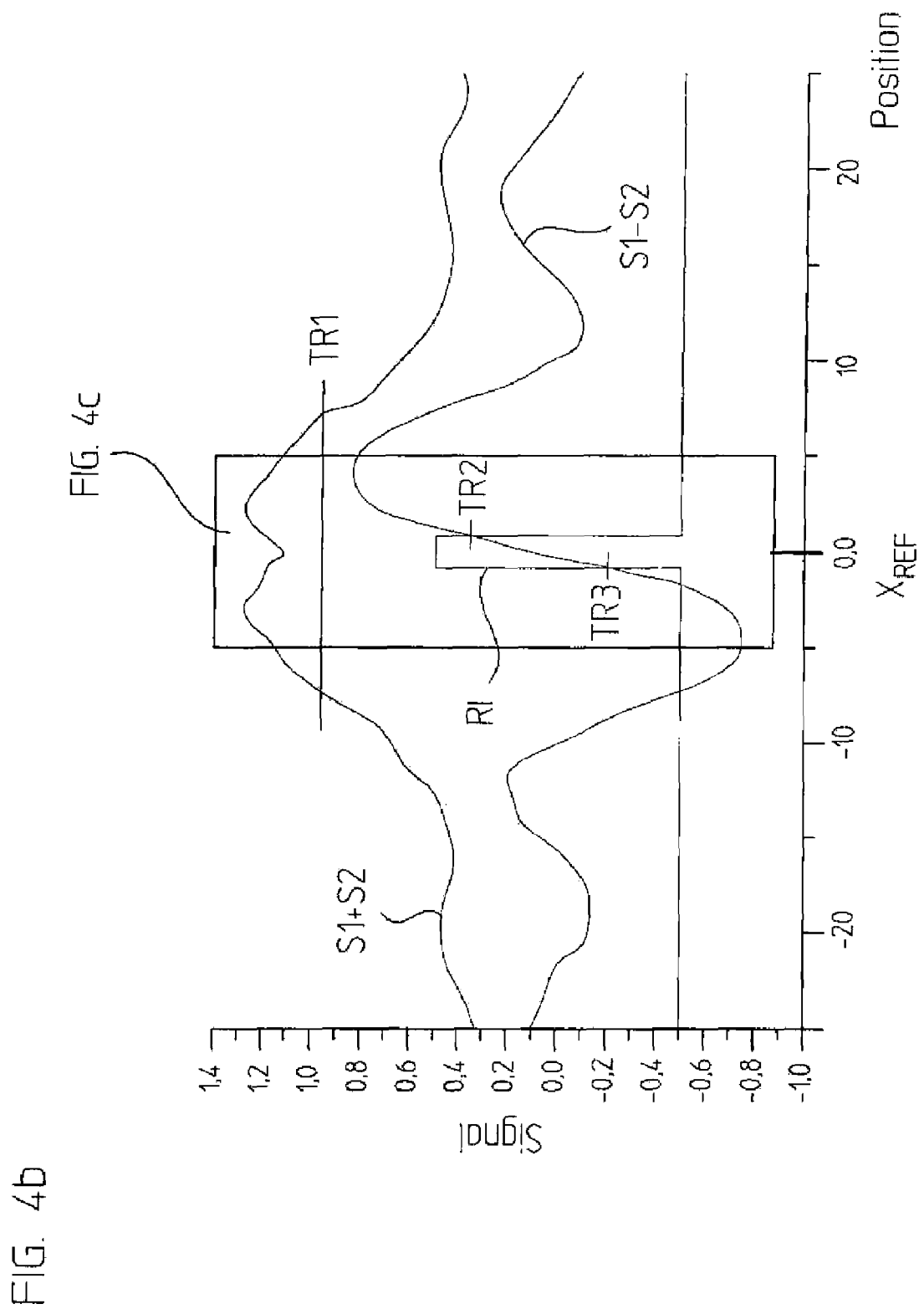

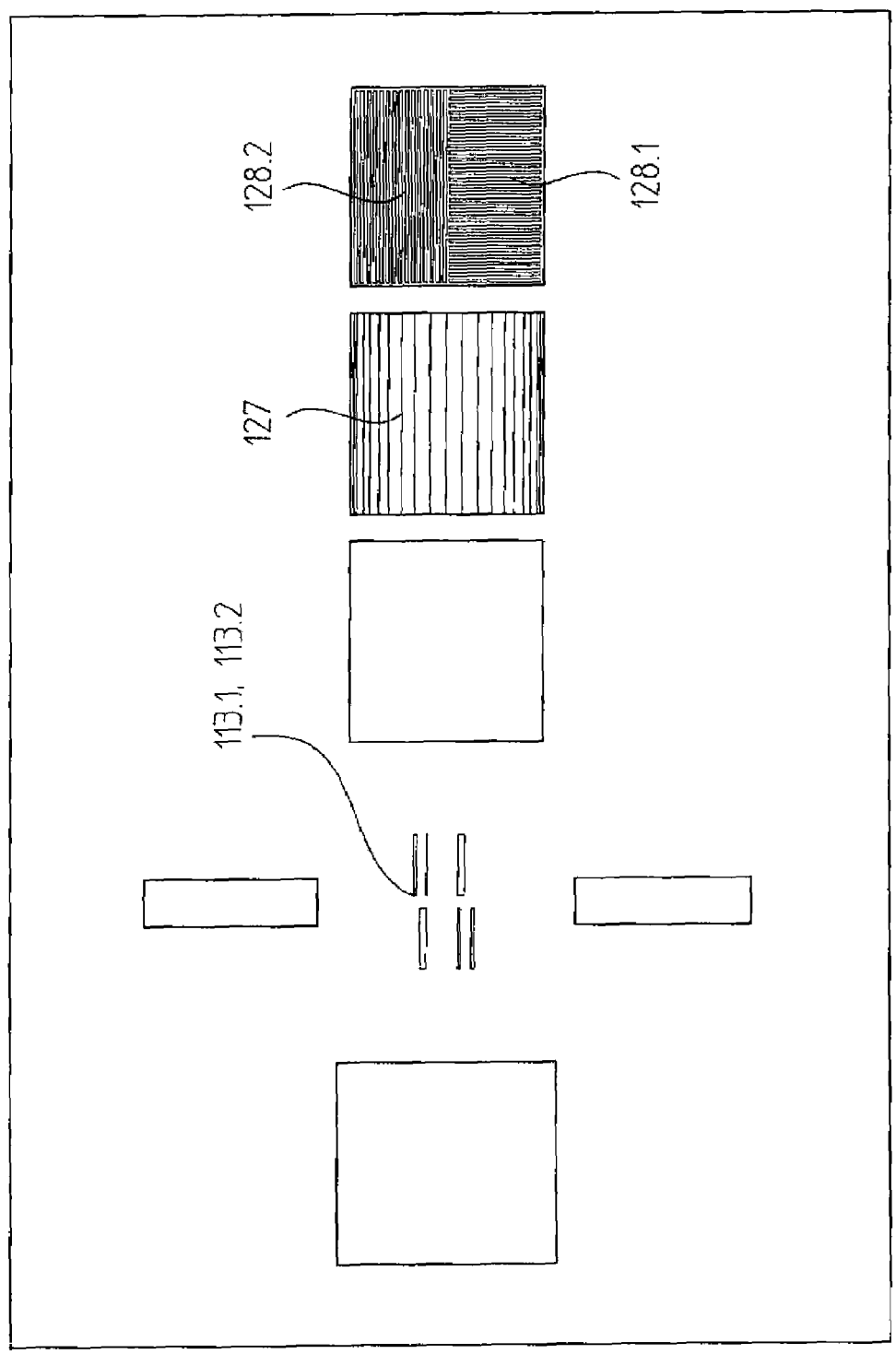

POSITION-MEASURING DEVICE

CROSS-REFERENCE TO RELATED APPLICATIONS

The present application claims priority to Application No. 10 2006 054 780.2, filed in the Federal Republic of Germany on Nov. 20, 2006, and to Application No. 10 2007 035 345.8, filed in the Federal Republic of Germany on Jul. 27, 2007, each of which is expressly incorporated herein in its entirety by reference thereto.

FIELD OF THE INVENTION

The present invention relates to a position-measuring device.

BACKGROUND INFORMATION

In addition to periodic incremental signals regarding the relative offset of two objects that are displaceable relative to one another, conventional position-measuring devices also supply so-called reference-pulse signals. With the aid of the reference-pulse signals, it is possible to obtain a precise absolute reference with regard to the position of the two mutually displaceable objects at individual specified reference positions along the measuring path. The incremental measurement, which typically has a much higher resolution, can be related to the absolute position determined in this manner. Numerous possibilities for generating the reference-pulse signals are convention.

In this context, reference is made, for example, to U.S. Pat. No. 5,073,710 and U.S. Pat. No. 5,981,941, both of which disclose variants of optical position-measuring devices. To generate the reference-pulse signals, diffractive reference-marking structures are mounted adjacent to the incremental track on the side of the measuring graduation at the reference position. Scanning of the reference marking produces a corresponding reference-pulse signal at the individual positions.

In particular in the case of high-resolution optical position-measuring devices operated in incident light, specific requirements will result with regard to the generation of the reference-pulse signals. For example, possible tilting of the scanning device and reflection-measuring graduation caused by, for example, a less than optimal installation of these devices should not cause any position error, if at all possible. This applies both to the generation of the incremental signals and the generation of the reference-pulse signals. The two above-referenced patent documents do not offer any suggestions for solving these problems.

SUMMARY

Example embodiments of the present invention provide a high-resolution position-measuring device for incident-light operation, in which possible tilting between the scanning unit and the reflection-measuring graduation interferes as little as possible with the generation of reference-pulse signals.

The same response to tilting of the scanning unit and the reflection-measuring graduation may be provided for the generation of the incremental signals as well as for the generation of the reference-pulse signals. It is therefore provided for both scannings that the so-called neutral points of rotation of the two scannings coincide. The neutral point of rotation of the individual scanning is the point about which tilting of scanning unit and reflection-measuring graduation may take place without causing a position error.

A defined adjustment of the position of the neutral point of rotation of the reference-pulse signal generation is possible, in particular by selective measures pertaining to the generation of the reference-pulse signals. Thus, it may be brought into agreement with the neutral point of rotation in the incremental-signal generation. In the arrangement of such a position-measuring device, the neutral point of rotation of the incremental-signal generation usually results from the particular system requirements. Using the measures described herein, the neutral point of rotation of the reference-pulse signal generation is able to be flexibly adapted to different conditions in the incremental-signal generation. This could mean, for example, that the neutral point of rotation of the reference-pulse signal generation comes to be located in a plane above or below the reflection-measuring graduation, etc.

To this end, a position-measuring device for generating a reference-pulse signal at at least one reference position is provided, which includes a scanning unit as well as a reflection-measuring graduation, which is displaceable thereto in at least one measuring direction. To generate the reference-pulse signal, the scanning unit includes a plurality of optical elements, among them at least one imaging optics as well as at least two diaphragm structures disposed in a diaphragm plane and having a plurality of diaphragm openings in each case. Furthermore, a light source and also at least two detector elements are assigned to the scanning unit. The reflection-measuring graduation has a reference marking at the at least one reference position, which includes at least one set of first structure elements, which is situated in the plane of the reflection measuring graduation, perpendicular to the measuring direction, periodically at a first transverse periodicity T1. Furthermore, the reference marking has at least one set of second structure elements, which is situated in the plane of the reflection-measuring graduation, perpendicular to the measuring direction, periodically at a second transverse periodicity T2. The first and the second transversal periodicities differ from each other. The structure elements are arranged as diffractive structure elements, which optically act like a cylindrical lens having a specific focal length in the measuring direction, and which act like a deflecting grating having the graduation period T1 or T2 perpendicular to the measuring direction.

In the measuring direction, the structure elements may have a virtual or real focal point at the focal-length distance from the reflection-measuring graduation.

The focal length of the structure elements may correspond to one half of the distance of the neutral point of rotation from the reflection-measuring graduation. In this context, the neutral point of rotation is defined as the point about which tilting of the scanning unit or the reflection-measuring graduation is possible without resulting in a position error.

The imaging optics within the scanning unit may be dimensioned such that imaging of the image-side focal plane of the structure elements into the diaphragm plane will result.

The reference marking may include a plurality of sets of first and second structure elements, which are disposed in parallel and in mirror symmetry with an axis of symmetry in the measuring-graduation plane, perpendicular to the measuring direction. Structure elements having different transversal periodicities are disposed opposite each other.

The individual structure elements may have a cross-sectional form that is made up of two straight boundary lines which extend in parallel in the transverse extension direction, and two parallel boundary lines which curve in the longitudinal extension direction.

The reflection-measuring graduation may also have at least one periodic incremental graduation extending in the measuring direction. In addition, the scanning unit includes a scanning device which generates periodic incremental signals in the event of a relative movement of the reflection-measuring graduation and scanning unit.

In such a position-measuring device, the focal length of the structure elements may be selected such that the position of the neutral point of rotation of the reference-pulse signal generation is adapted to the position of the neutral point of rotation of the incremental-signal generation. In this context, the neutral point of rotation is defined as the point about which tilting of the scanning unit or the reflection-measuring graduation is possible without resulting in a position error.

The positional placement of the diaphragm openings of the two diaphragm structures in the measuring direction may be adapted to the placement of the structure elements of the reference marking.

The imaging optics may be designed as a lens array made up of a plurality of individual lenses.

The scanning unit may include, for example, a scanning plate on which the diaphragm structures and the imaging optics are situated.

The scanning plate may be arranged as follows:
  The diaphragm structures, which are embodied as light-transmitting/opaque structures, are disposed on its side facing away from the reflection-measuring graduation, and
  The imaging optics are disposed on its side facing the reflection-measuring graduation.

As an alternative, the scanning unit may include a scanning plate on whose side facing the reflection-measuring graduation the diaphragm structures and the imaging optics are disposed. The diaphragm structures are arranged as reflective/non-reflective structures.

Furthermore, a splitting grating may be situated on the scanning plate, via which a beam of rays coming from the light source may be split into a partial beam of rays that is utilized to generate a reference-pulse signal, and into a partial beam of rays that is utilized to generate an incremental signal.

The splitting grating may be configured such that convergent illumination of the reference marking on the reflection-measuring graduation occurs.

For example, the splitting grating may be arranged as a diffractive beam-splitter element having curved grating lines.

On the side of the scanning plate having an orientation facing away from the reflection-measuring graduation, one or several reflector element(s) may be disposed, which deflect(s) a beam of rays falling thereon back in the direction of the side of the scanning plate facing the reflection-measuring graduation.

The splitting grating may be situated, for example, on the side of the scanning plate facing the reflection-measuring graduation.

An addition element and a subtraction element may be post-connected to the two detector elements. Connected downstream therefrom is a plurality of comparator elements, which have individually defined trigger thresholds and are interconnected such that a reference-pulse signal whose width corresponds to the width of the generated incremental signals results on the output side.

Furthermore, the scanning unit may include correction device for generating auxiliary signals, which represent a measure for the change in the angle relative to the scanning plate, at which a beam of rays coming from the light source propagates in the direction of the reference marking.

The scanning unit may include the following correction device for the generation of the auxiliary signals:
  A Fresnel lens, disposed on the side of the scanning plate facing away from the reflection-measuring graduation, whose focal point lies in the plane of the splitting grating and which is acted upon by a partial beam of rays split off from the incident beam of rays via the splitting grating,
  A reflector element, which is situated in the focal point of the Fresnel lens on the side of the scanning plate facing the reflection-measuring graduation,
  Two periodic grating structures, disposed perpendicular to one another, on the side of the scanning plate facing away from the reflection-measuring graduation,
  Two auxiliary-signal detector elements, which are differentially connected to one another, the resulting difference signal being used as auxiliary signal for setting the trigger thresholds.

As an alternative, the scanning unit may include the following correction device for generating the auxiliary signals:
  A grating lens structure, disposed on the side of the scanning plate facing away from the reflection-measuring graduation, which corresponds to the reference marking and whose focal point lies in the plane of the splitting grating and which is acted upon by a partial beam of rays split off from the incident beam of rays via the splitting grating,
  A reflector element, which is situated in the focal point of the grating-lens structure on the side of the scanning plate facing the reflection-measuring graduation,
  Two diaphragm structures, which are disposed on the side of the scanning plate facing away from the reflection-measuring graduation,
  Two auxiliary-signal detector elements, which are differentially connected to one another, the resulting difference signal being used as auxiliary signal for setting the trigger thresholds.

Additional features and aspects of example embodiments of the present invention are described in more detail below with reference to the appended Figures.

BRIEF DESCRIPTION OF THE DRAWINGS

FIG. 2 is a partial plan view of the reflection-measuring graduation of the position-measuring device, including an enlarged cutaway of the reference marking.

FIG. 4a illustrates the resulting signals for the generation of reference pulses with the aid of the position-measuring device.

FIG. 4b illustrates the sum and difference signals produced from the signals illustrated in FIG. 4a, including the trigger thresholds utilized to generate the reference-pulse signal.

FIG. 9b is a plan view of the topside of the scanning plate of the position-measuring device illustrated in FIG. 9a.

FIG. 9c is a plan view of the underside of the scanning plate of the position-measuring device illustrated in FIG. 9a.

FIG. 11b is a plan view of the topside of the scanning plate of the position-measuring device illustrated in FIG. 11a.

FIG. 11c is a plan view of the underside of the scanning plate of the position-measuring device illustrated in FIG. 11a.

DETAILED DESCRIPTION

A position-measuring device according to an example embodiment of the present invention and, in particular, the generation of a reference-pulse signal RI with the aid of this device is described below with reference to FIGS. 1 to 5.

Figure 1A:
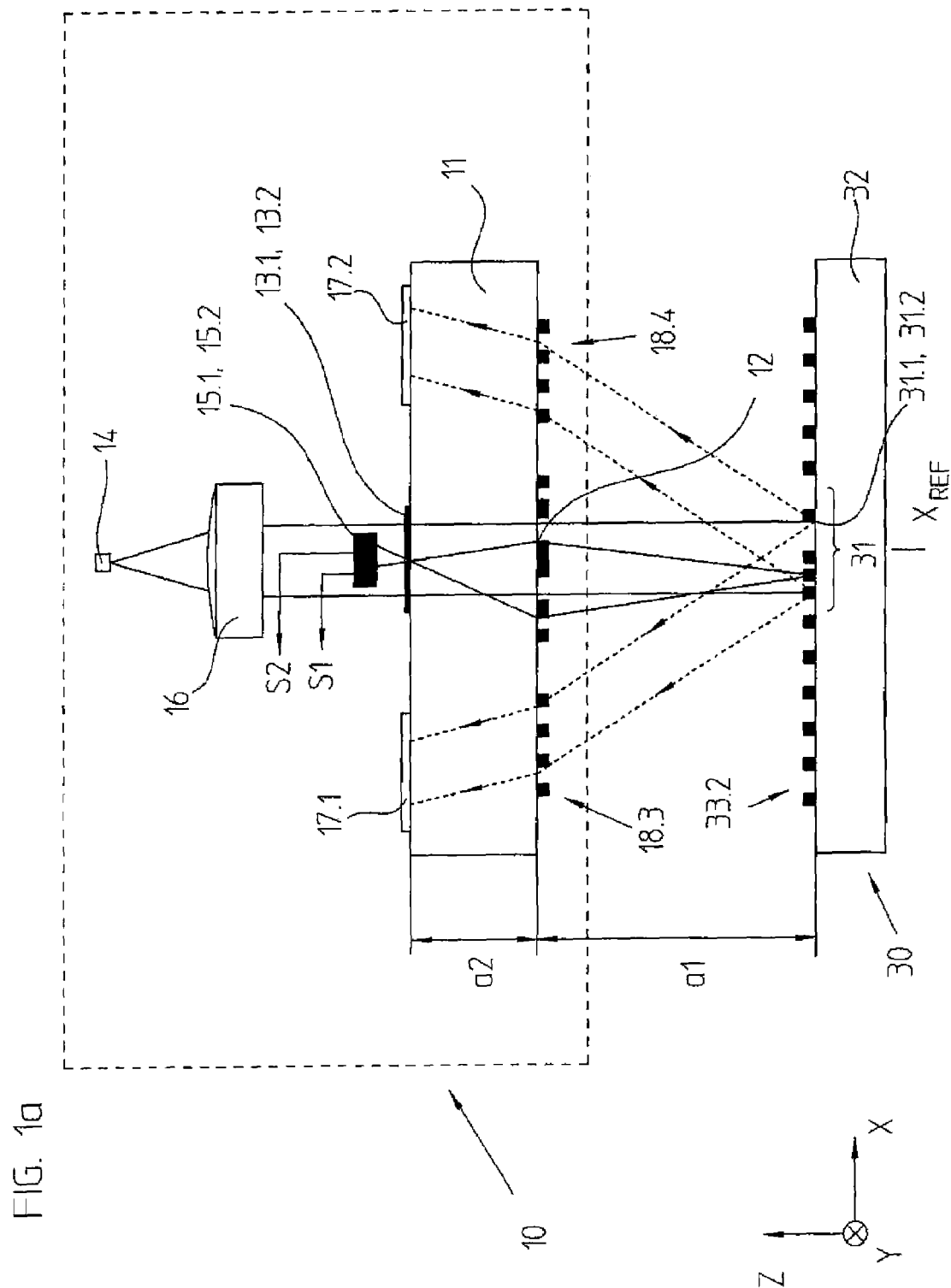
FIG. 1a schematically illustrates partial-scanning beam paths of a position-measuring device according to an example embodiment of the present invention, to describe the generation of reference-pulse signals.
Figure 1B:
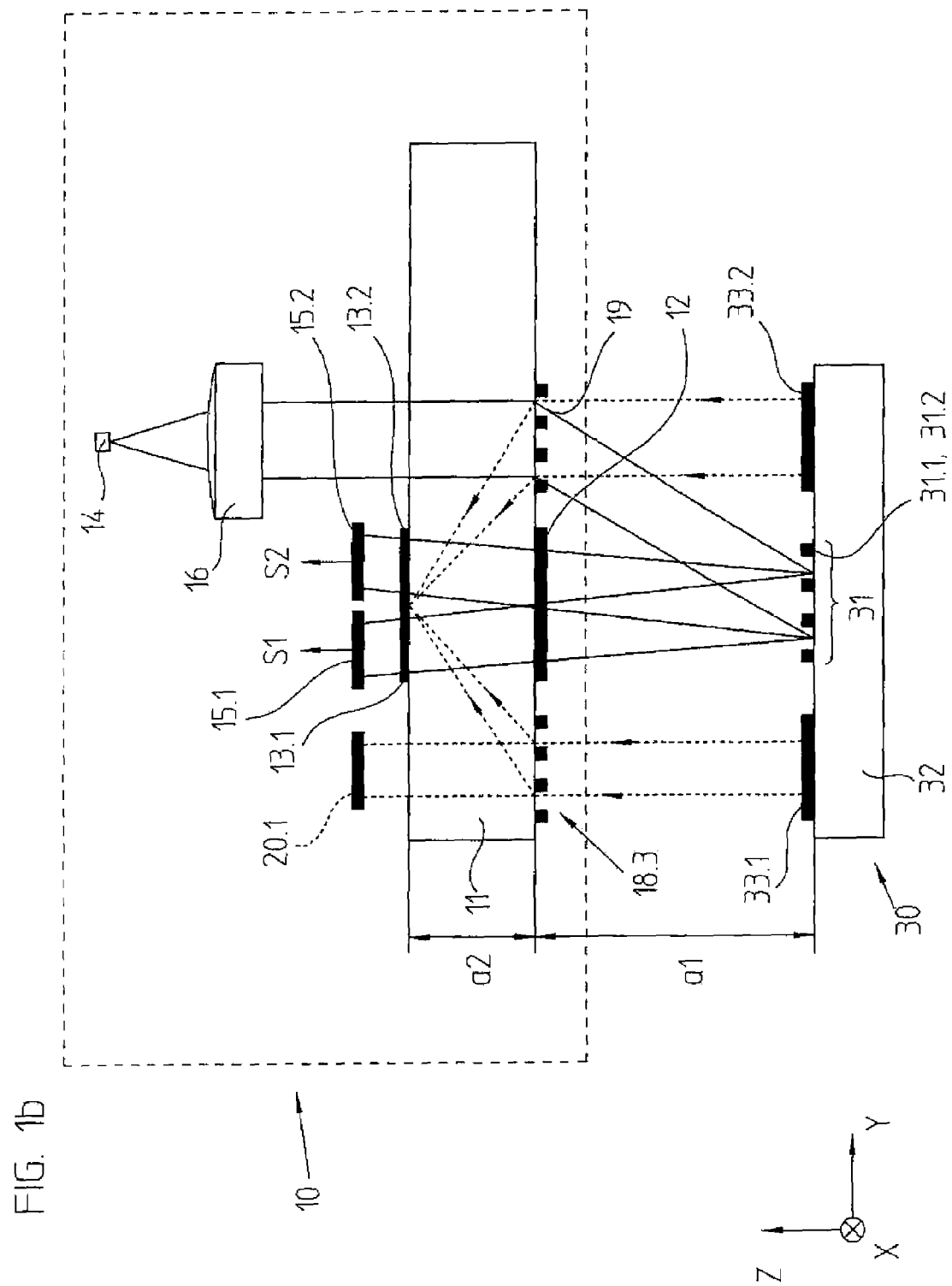
FIG. 1b schematically illustrates partial-scanning beam paths of the position-measuring device, to describe the generation of reference-pulse signals.
Figure 1C:
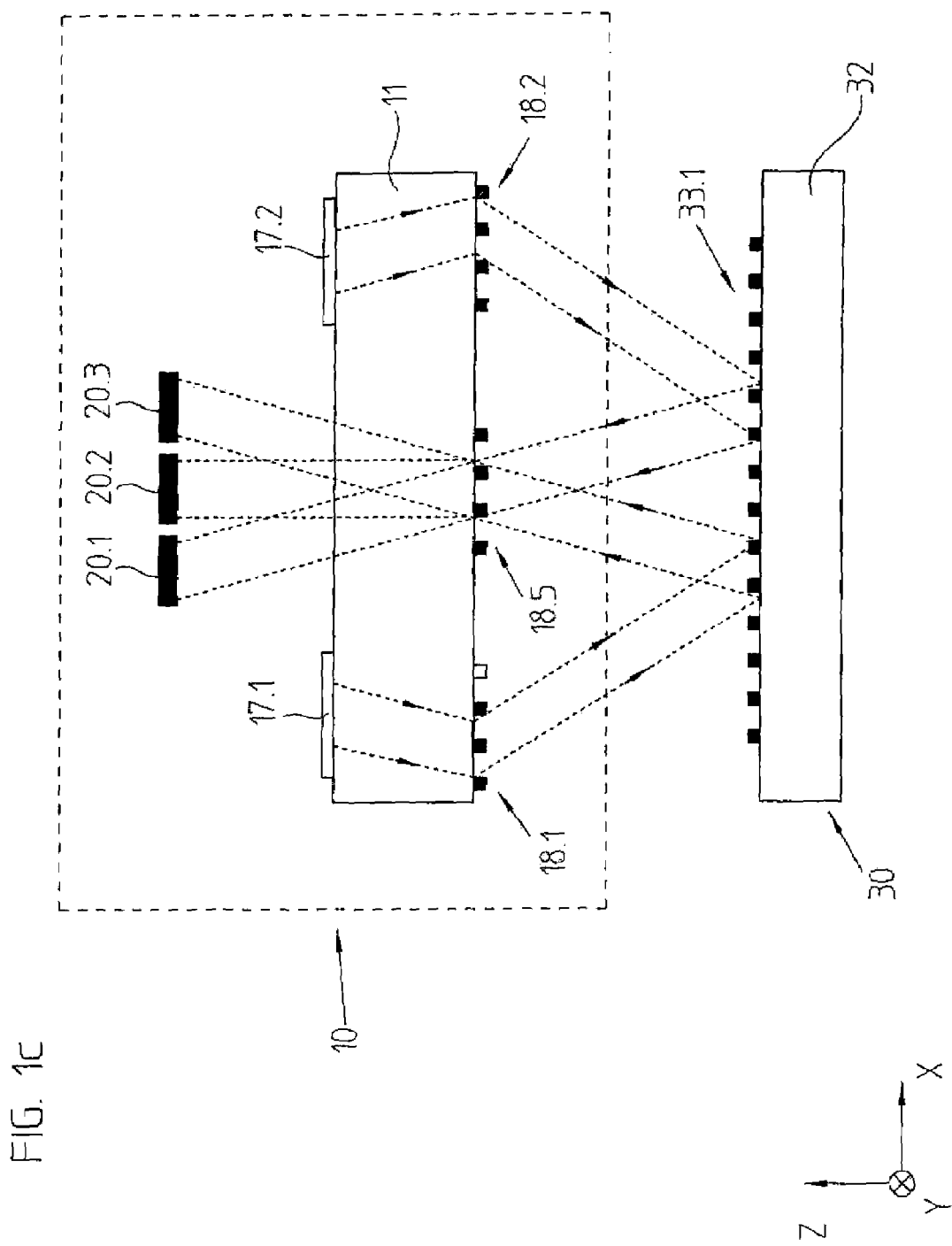
FIG. 1c schematically illustrates partial-scanning beam paths of the position-measuring device, to describe the generation of incremental signals.

FIGS. 1a and 1b illustrate scanning-beam paths for the generation of reference-pulse signals in a position-measuring device, in highly schematic form and in different partial views. FIG. 1c schematically illustrates partial scanning-beam paths for generating the incremental signals in the position-measuring device.

In FIGS. 1a to 1c and also in the following similar figures in connection with alternative example embodiments, the partial scanning-beam paths for the generation of reference-pulse signals are shown as solid lines in each case, while the partial scanning-beam paths for the generation of the incremental signals are indicated by dashed lines.

The illustrated example embodiment of an optical position-measuring device includes a reflection-measuring graduation 30 as well as a scanning unit 10, which is displaceable thereto in at least one measuring direction x. Reflection-measuring graduation 30 and scanning unit 10 are connected to two objects, such as machine components, which are displaceable relative to one another. Position signals concerning the position of the two objects displaceable relative to one another are generated and conveyed to a control unit via the position-measuring device. The control unit utilizes the positional data for control purposes, e.g., in a conventional manner. The position-measuring device may be arranged both for linear and rotary displacement movements.

As described below, the illustrated exemplary embodiment of a position-measuring device provides not only periodic incremental signals $INC_A$, $INC_B$ but also a reference-pulse signal RI at at least one known reference position $X_{REF}$ along the measuring path. The incremental measurement, which has a considerably higher resolution, may be related in a conventional manner to the known absolute position determined in this manner.

To begin with, the generation of reference-pulse signal RI, which is of greater importance, is described with the aid of the partial scanning-beam paths provided for this purpose.

In addition to one or a plurality of incremental graduations 33.1, 33.2 extending in measuring direction x, reflection-measuring graduation 30 also includes at least one reference marking 31 at a defined reference position $X_{REF}$. In general, it is also possible to dispose a plurality of reference markings at different reference positions, for example in the form of so-called distance-coded reference markings, etc.

As can be gathered from the plan view of a portion of reflection-measuring graduation 30 in FIG. 2, two parallel, identical incremental graduations 33.1, 33.2 are arranged on a carrier body 32 for the purpose of generating incremental signals $INC_A$, $INC_B$. Each incremental graduation 33.1, 33.2 includes linear graduation regions having different optical characteristics. They are arranged periodically in measuring direction x using graduation period $TP_{INC}$. For example, reflection-measuring graduation 30 may be incident-light phase gratings, in which alternating partial regions have different phase-shifting effects on the reflected beams. It may be provided, for example, that $TP_{INC}=0.5$ μm. The partial regions extend in the plane of reflection-measuring graduation 30, perpendicular to measuring direction x, i.e., in the indicated y-direction (also referred to as line direction in the following text).

At reference position $X_{REF}$, a reference marking 31 is arranged between the two tracks for incremental graduations 33.1, 33.2. Like incremental graduations 33.1, 33.2, it includes a specific arrangement of partial regions or structure elements 31.1, 31.2 having different reflective properties. In the following text, an example embodiment is described in greater detail.

Arranged on the side of scanning unit 10 are a light source 14, such as a laser diode, as well as collimation optics 16, a plurality of detector elements 15.1, 15.2 for generating the reference-pulse signal, a plurality of detector elements 20.1, 20.2, 20.3 for generating the incremental signal (FIG. 1c), and also various additional optical elements. The different optical elements for generating the reference-pulse signals and incremental signals RI, $INC_A$, $INC_B$, respectively, are arranged on a scanning plate 11 in scanning unit 10 and will still be described in detail in the following text.

It should be noted that light source 14, collimation optics 16 and various detector elements 15.1, 15.2, 20.1, 20.2, 20.3 need not necessarily be arranged inside scanning unit 10 or in a corresponding housing thereof. In alternative arrangements, for example, it is also possible to assign these components to scanning unit 10, e.g., in a conventional manner, via optical waveguides, and to dispose the different elements in separate locations outside of scanning unit 10.

A splitting grating 19 splits up the beam of rays, which has a parallel orientation downstream from collimation optics 16, into a scanning beam path (solid boundary lines in FIGS. 1a to 1c) for the generation of reference-pulse signal RI, and into a scanning-beam path (dashed boundary lines in FIGS. 1a to 1c) for the generation of incremental signals $INC_A$, $INC_B$. As can be gathered from FIG. 1b, this means that the partial beam of rays split off for the generation of the reference-pulse signal is deflected into the region between the two incremental graduations 33.1, 33.2 on reflection-measuring graduation 30. The grating constant of splitting grating 19 may be selected such that, given the standard scanning clearance between scanning unit 10 and reflection-measuring graduation 30, a region precisely in the center between both incremental graduations 33.1, 33.2 will be illuminated. From this region, a back reflection in the direction of scanning unit 10 takes place. In scanning unit 10, the back-reflected partial beams of rays fall on an imaging optics 12, which is disposed on the underside of scanning plate 11. Imaging optics 12 may be arranged in different forms on scanning plate 11, for example, as a single Fresnel lens. As an alternative, imaging optics 12 may also be arranged as lens array having a plurality of individual lenses. This will be discussed in greater detail in the course of the following description.

Placing reference marking 31 between the two incremental graduations 33.1, 33.2 provides that no (falsifying) change in the position of reference-pulse signal RI relative to incremental signals $INC_A$, $INC_B$ will result in the event of twisting of reflection-measuring graduation 30 and scanning unit 10 about the z-axis.

Imaging optics 12 is optically dimensioned such that its image-side focal plane coincides with the top surface of scanning plate 11 or a diaphragm plane situated there, in which two diaphragm structures 13.1, 13.2 each having a plurality of diaphragm openings are disposed. Situated downstream from diaphragm structures 13.1, 13.2 are two detector elements 15.1, 15.2 in scanning unit 10, which are used to detect the light transmitted through the diaphragm openings, and thus to generate reference-pulse signal RI using signals S1, S2. On the object-side, the focus imaged by imaging optics 12 is at the level of one half of the distance between the neutral point of rotation and the surface of reflection-measuring graduation 30. That means that, on the object-side, imaging optics 12 is adapted to a plane or a point that results from the position of the system-controlled neutral point of rotation. The neutral point of rotation in this context is the point about which scanning unit 10 or reflection-measuring graduation 30 may be tilted without causing errors in the position determination, i.e., errors in the generation of reference-pulse signal RI or incremental signals $INC_A$, $INC_B$. Depending on the system realities, the neutral point of rotation may be in different planes, i.e., both in the measuring-graduation plane as well as below or above the measuring-graduation plane.

Significant for the generation of reference-pulse signal RI is the selected arrangement of reference marking 31 on the side of reflection-measuring graduation 30. Its corresponding arrangement is responsible for the reliable detection of a reference-pulse signal RI at reference position $X_{REF}$. For a more detailed discussion of reference marking 31, reference is made to FIG. 2, for example, which is a plan view of reflection-measuring graduation 30 in the region of reference position $X_{REF}$.

In the region of reference position $X_{REF}$ between the two incremental graduations 33.1, 33.2, reference marking 31 has a first set of structure elements 31.1 as well as a second set of structure elements 31.2 in specific geometric arrangements. Structure elements 31.1, 31.2 of both sets are arranged in the plane of reflection-measuring graduation 30, perpendicular to measuring direction x, i.e., in the indicated line direction y, periodically at a first transversal periodicity T1 and a second transversal periodicity T2, respectively. Transversal periodicities T1, T2 of the two sets of first and second structure elements 31.1, 31.2 differ from one another, as can also be gathered from FIG. 2. For example, T1=2.4 µm, and T2=2.0 µm may be selected.

In the illustrated exemplary embodiment of FIG. 2, reference marking 31 includes a total of four separate sets of first structure elements 31.1, and four separate sets of second structure elements 31.2, which are arranged in parallel next to each other in measuring direction x. That is to say, a total of eight sets of structure elements 31.1, 31.2 are arranged in measuring direction x. In measuring direction x, the four sets of first and second structure elements 31.1, 31.2 are arranged in mirror symmetry with an axis of symmetry S which is oriented perpendicular to measuring direction x in the plane of reflection-measuring graduation 30. In the example illustrated, axis of symmetry S is located precisely at reference position $X_{Ref}$. Structure elements 31.1, 31.2 having different transversal periodicities T1, T2 are arranged opposite one another, in mirror symmetry with respect to axis of symmetry S.

As can be gathered from the enlarged cutaway of reference marking 31 in FIG. 2, in this example, each structure element 31.1, 31.2 has a cross-sectional form that includes two straight boundary lines extending in parallel in transversal direction y, and two parallel boundary lines that curve in longitudinal extension direction x. The optical effect of these elements, which will be discussed in more detail further below, results from the selected cross-sectional form. Furthermore, sets having first and second structure elements 31.1, 31.2, respectively, differ by different transversal periodicities T1, T2 at which the individual structure elements 31.1, 31.2 are periodically arranged in the y-direction.

When the partial beams of rays used to generate reference-pulse signal RI and arriving from splitting grating 19 of scanning unit 10 fall on the region of reference marking 31 having the sets of first and second structure elements 31.1, 31.2, the partial beams of rays are also deflected to varying degrees in the y-direction in the y-z plane, due to the different transversal periodicities T1 and T2 of the different sets. The particular deflection angle is usually a direct function of the individual transversal periodicity T1, T2. Via imaging optics 12 in scanning unit 10, the back-reflected partial beams of rays from the region of reference marking 31 are imaged into the diaphragm plane. With regard to the geometric arrangement of the plurality of diaphragm openings, the two diaphragm structures 13.1, 13.2 located there are adapted to the geometric arrangement of the sets of first and second structure elements 31.1, 31.2 of reference marking 31. This means that the openings of a first diaphragm structure 13.1 are adapted to the arrangement of the sets of first structure elements 31.1, and the openings of a second diaphragm structure 13.2 are adapted to the arrangement of the sets of second structure elements 31.2. This can be gathered from a comparison of FIGS. 2 and 3b. According to the example illustrated in FIG. 2, for example, four sets of first structure elements 31.1 are provided in the reference marking, to which first diaphragm structure 13.1, adapted thereto, with the four illustrated diaphragm openings is assigned. Analogously, the four sets of second diaphragm structure elements 31.2 are assigned the four diaphragm openings, adapted thereto, of second diaphragm structure 13.2. A different number of diaphragm openings and sets of structure elements is selectable as well. In choosing the positions of the diaphragm openings, imaging scale m resulting from imaging optics 12 should be taken into account as well.

Such an adaptation has the result that, in the region adjacent to reference position $X_{REF}$, each of the two detector elements 15.1, 15.2 downstream from the two diaphragm structures 13.1, 13.2 is able to detect a signal maximum of signals S1, S2 detected thereby.

As mentioned above, the imaging optics may also alternatively be arranged as a lens array which includes a plurality of individual lenses. Longer sets of structure elements are thereby able to be imaged into the diaphragm plane in line direction y. This arrangement provides advantages as far as the signal strength of the detected signals is concerned. In such a case, a partial sequence of a set of structure elements is imaged by one lens in each case. In this arrangement as well, one diaphragm opening of diaphragm structure 13.1, 13.2 is assigned to each set of structure elements 31.1, 31.2 in a defined manner. The positions of the diaphragm openings result in coordinated fashion from the imaging of the sets of structure elements 31.1, 31.2 via imaging optics 12 at imaging scale m.

Signals S1, S2 applied at detector elements 15.1, 15.2 in the region around reference position $X_{REF}$ are illustrated in FIG. 4a. The manner in which reference-pulse signal RI which is of interest here can ultimately be generated from these signals S1, S2 is explained in greater detail in the course of the following description.

For the generation of incremental signals $INC_A$, $INC_B$, reference is made to, e.g., FIG. 2 as well as FIGS. 1a and 1b, in which the partial scanning-beam paths for the generation of the incremental signals are indicated by a dashed line in each case.

In the process, the beams of rays for the incremental-signal generation, emitted by light source 14 and having passed through splitting grating 19 without deflection, fall on incremental graduation 33.2 on reflection-measuring graduation 32. From there, the partial beams of rays split up in the x-z plane are reflected back in the direction of scanning unit 10, where they pass through scanning gratings 18.3, 18.4 disposed on the underside of scanning plate 11 (FIG. 1a). They deflect the partial beams of rays in the y-direction, so that the partial beams of rays strike two reflector elements 17.1, 17.2 on the top surface of scanning plate 11 (FIG. 1b). Reflector elements 17.1, 172 reflect the two partial beams of rays back in the direction of additional scanning gratings 18.1, 18.2 on the underside of scanning plate 11, which then deflect the partial beams of rays back in the direction of second incremental graduation 33.1 on reflection-measuring graduation 30 (FIG. 2). From incremental graduation 33.1, another back-reflection of the partial beams of rays in the direction of scanning unit 10 takes place. There, the two back-reflected partial beams of rays fall on a combination grating 18.5 on the underside of scanning plate 11. Three pairs of interfering partial beams of rays ultimately propagate from combination grating 18.5 in the direction of three downstream detector elements 20.1, 20.2, 20.3, which detect three periodic signals phase-shifted by 120° in each case, which are modulated as a function of the shift. In, e.g., a conventional manner, these are converted into two incremental signals $INC_A$, $INC_B$ phase-shifted by 90°, via a downstream electronics system. As far as the incremental scanning is concerned, reference is also made to German Patent Application No. 10 2006 042 743, which is expressly incorporated herein in its entirety by reference thereto.

Figure 3A:
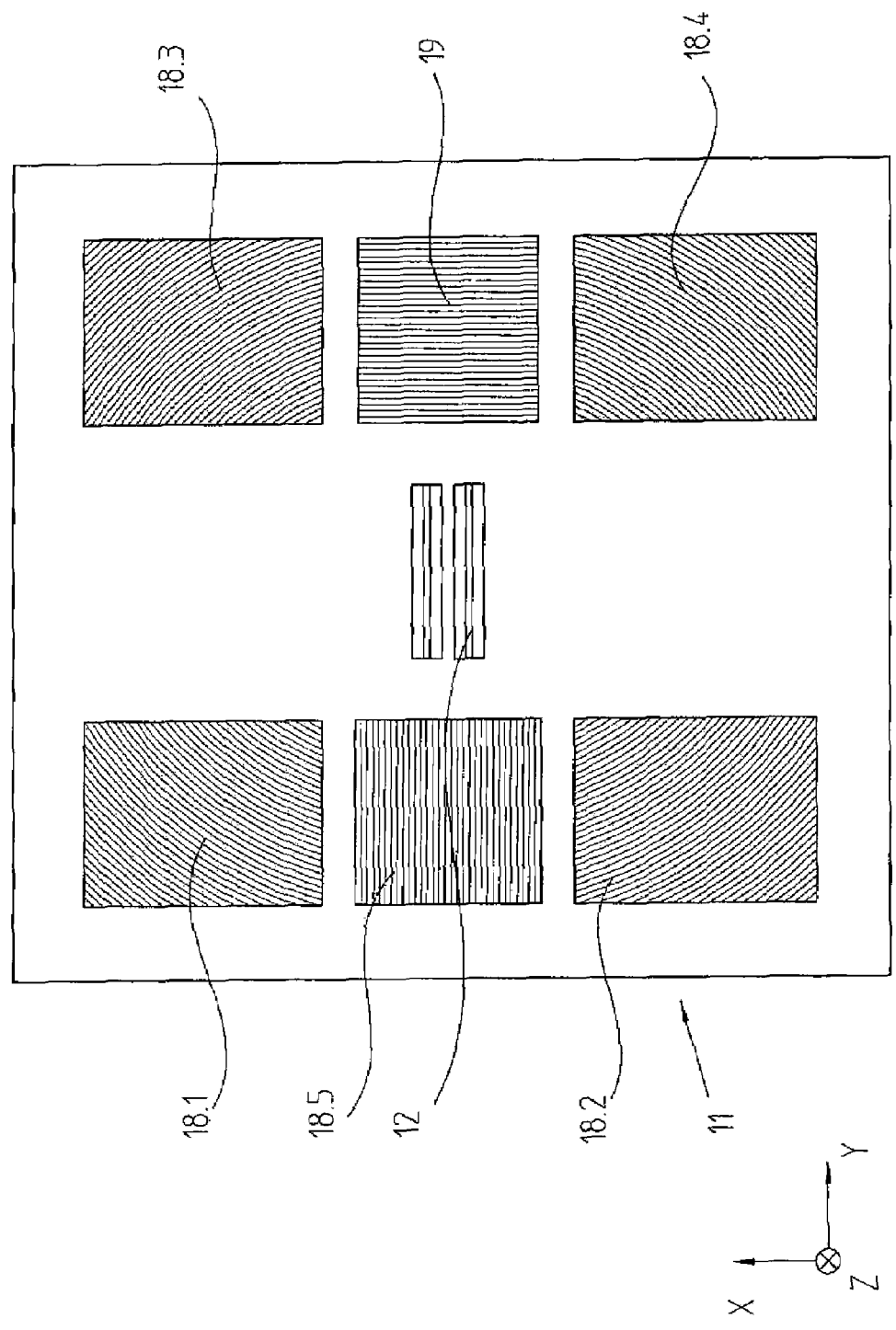
FIG. 3a is a plan view of the underside of the scanning plate of the position-measuring device.
Figure 3B:
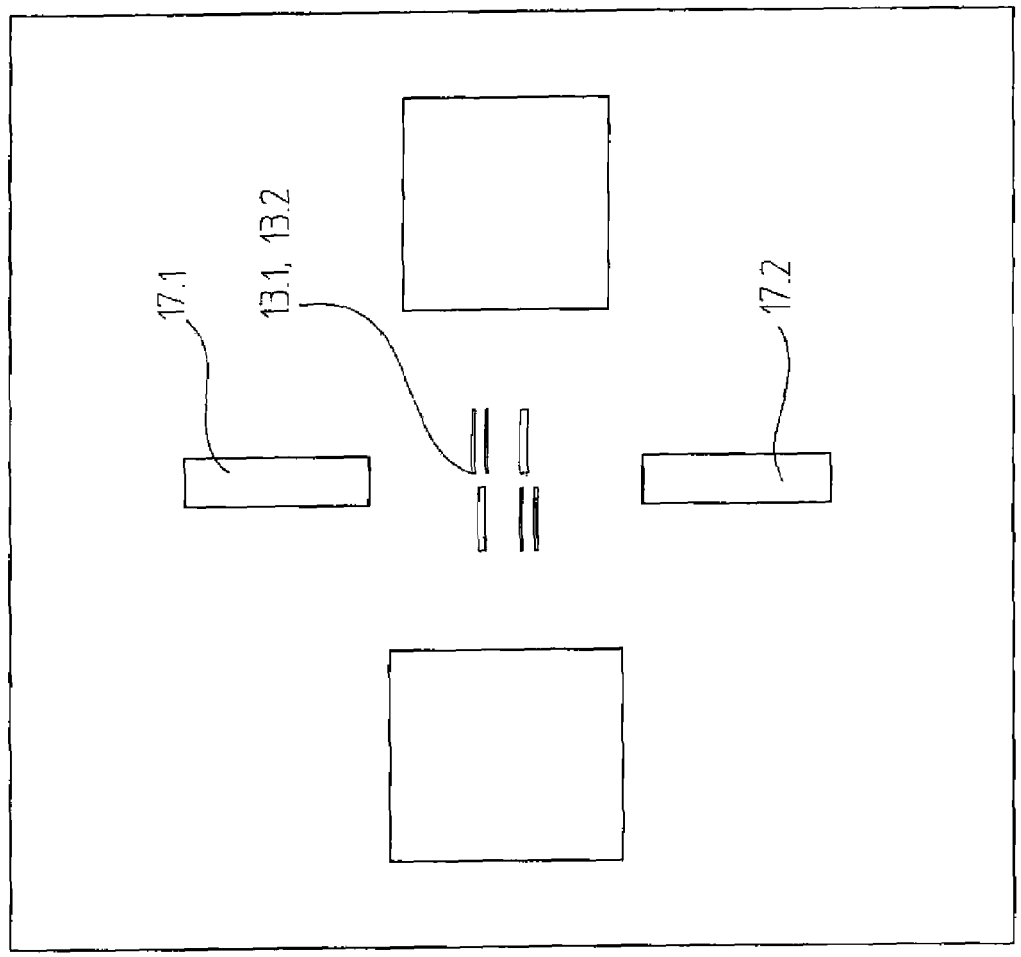
FIG. 3b is a plan view of the topside of the scanning plate of the position-measuring device.

The placement of the various optical elements for generating reference-pulse signal RI as well as incremental signals $INC_A$, $INC_B$ on the top surface and the underside of scanning plate 11 is illustrated in FIGS. 3a and 3b.

As mentioned above, signals S1, S2 are generated in the region of reference position $X_{REF}$ via detector elements 15.1, 15.2, as illustrated in FIG. 4a. However, the width of signals S1, S2, amounting to approximately 15 µm, is not sufficiently narrow enough yet for a reference-pulse signal RI, for example, when using high-resolution incremental signals $INC_A$, $INC_B$ having signal periods of 0.5 µm, for example, as described above. In this context it is basically desirable to have a reference-pulse signal RI available on the output side that has a width in the region of reference position $X_{REF}$ that corresponds to the width of generated incremental signals $INC_A$, $INC_B$. For this reason, exemplary embodiments provide further processing of signals S1, S2 via the circuit system illustrated in FIG. 5, which is further described below.

Figure 4C:
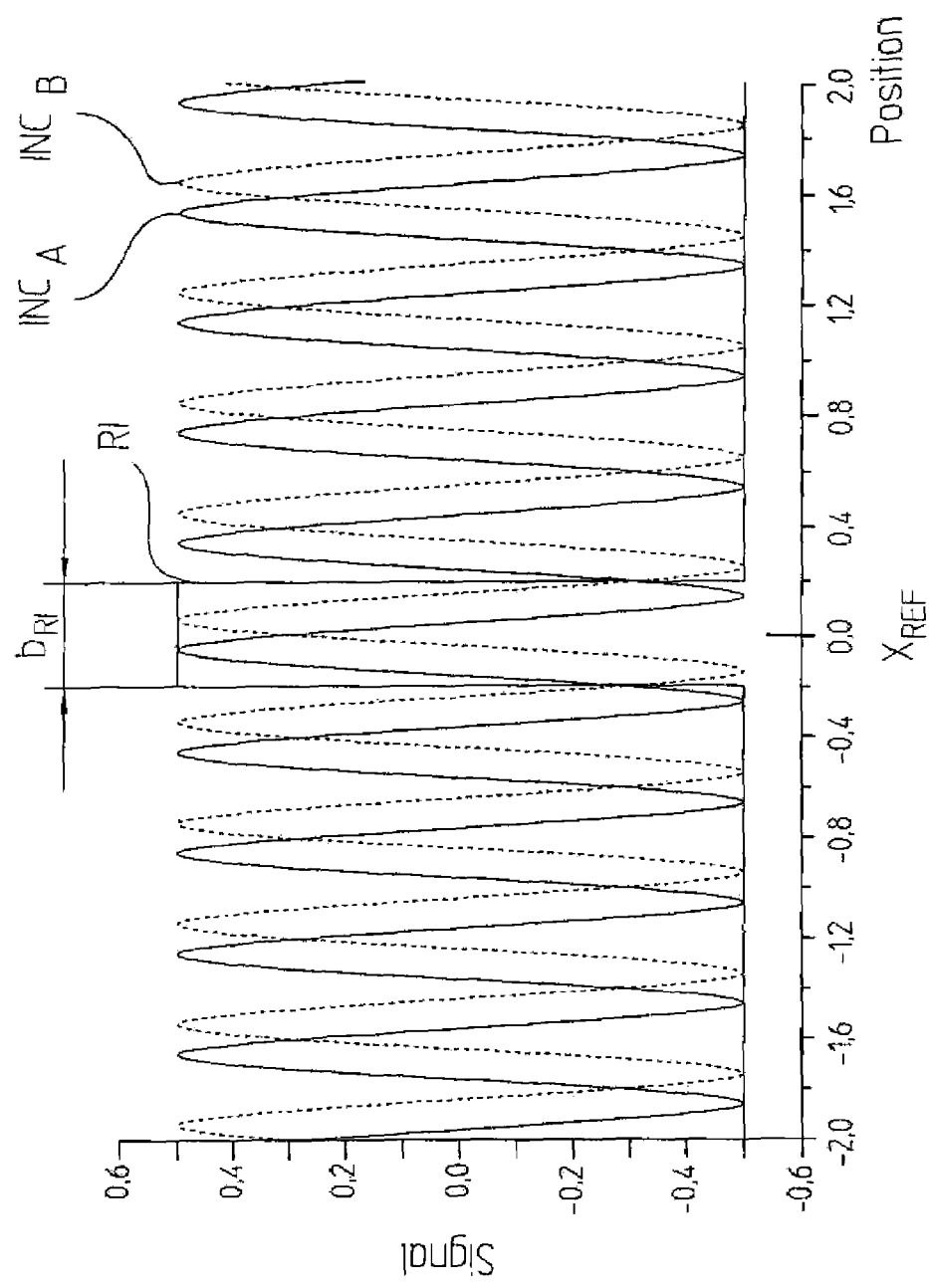
FIG. 4c illustrates the resulting reference-pulse signal at the reference position, including an illustration of the incremental signals.

In the process, signals S1, S2 at detector elements 15.1, 15.2 are first conveyed to current-voltage converters 21.1, 21.2. Via downstream addition and subtraction elements 22, 23, respectively, a sum signal S1+S2 as well as a difference signal S1−S2 are subsequently formed. Associated sum and difference signals S1+S2, S1−S2 are shown in the region of reference position $X_{REF}$ in FIG. 4b. Sum signal S1+S2 is supplied to a first comparator element 24.1 at whose other input the reference signal or trigger threshold TR1 is applied. Difference signal S1−S2 is conveyed to a second and third comparator element 24.2, 24.3 at whose other inputs trigger thresholds TR3 and TR2 are applied as reference signals. FIG. 4b shows the position of the different trigger thresholds TR1, TR2 and TR3 with respect to sum and difference signal S1+S2, S1−S2. The output signal of first comparator element 24.1 is subsequently supplied to a first input of an AND gate 25.1. Supplied to its second input is the output signal from a second AND gate 25.2 to which the output signals of second and third comparator elements 24.2, 24.3 are conveyed. Given the indicated selection of trigger thresholds TR1, TR2, TR3 and the implemented logical AND operations, the desired reference-pulse signal RI results at the output of logic element 25.1, the reference-pulse signal having a width $b_{RI}$=0.5 µm which corresponds to width $b_{INC}$ of generated incremental signals $INC_A$, $INC_B$, as shown in FIG. 4c.

In the following text further details for example embodiments of reference marking 31 on the side of reflection-measuring graduation 30 are described. With the aid of the measures discussed below it is possible to provide, for example, that the position of the neutral point of rotation in the generation of reference-pulse signal RI is adaptable to the position of the neutral point of rotation in the generation of the incremental signal. As mentioned above, this constitutes a significant measure for avoiding faulty measurements in a possible tilting of scanning unit 10 and reflection-measuring graduation 30.

Towards this end, the previously mentioned structure elements 31.1, 31.2 of reference marking 31 are arranged as diffractive optical elements or diffractive structure elements, which optically act like a cylinder lens having a specific focal length f in measuring direction x and therefore have a virtual or real focal point at the distance of focal length f from the reflection-measuring graduation in measuring direction x. In the y-z plane, structure elements 31.1, 31.2 have an optical effect such that they function as grating having transversal period T1 or T2.

Selected focal length f of structure elements 31.1, 31.2 may correspond to one half of the distance of the neutral point of rotation of the incremental-signal scanning from reflection-measuring graduation 30 when it lies above or below of reflection-measuring graduation 30 for system-related reasons. In this manner, the position of the neutral point of rotation of the reference-pulse signal generation is able to be adapted to the position of the neutral point of rotation of the incremental-signal generation. Should tilting of scanning unit 10 and reflection-measuring graduation 30 occur, it is possible to avoid errors in the position measurement that would otherwise result.

Furthermore, it is provided to adapt imaging optics 12 in scanning unit 10 on the object-side to the position of the focal plane of structure elements 31.1, 31.2. With the aid of imaging optics 12, this focal plane is imaged into the diaphragm plane in which diaphragm structures 13.1, 13.2 are arranged. These requirements are able to be characterized in the following manner through the phase function of imaging optics 12:

$$P = \frac{2\pi}{\lambda_D} \left( \sqrt{x^2 + (a_1 \pm f)^2} + n\sqrt{x^2 + a_2^2} \right) \quad \text{(equation 1)}$$

in which:
$\lambda_D$ represents the wavelength of the utilized light source;
x represents the coordinate in the measuring direction;
$a_1$ represents the distance between the measuring-graduation plane and the imaging optics;
$a_2$ represents the distance between the imaging optics and diaphragm plane;
n represents the refractive index of the scanning plate; and
f represents the focal lengths of the structure elements of the reference marking.

In this context the phase function describes the geometry of imaging optics 12 in the form of the contour lines of this element.

Imaging scale m of imaging optics 12 may be selected as follows:

$$m = -n \frac{(a_1 \pm f)}{a_2} \quad \text{(equation 2)}$$

in which:
$a_1$ represents the distance between the measuring-graduation plane and imaging optics;
$a_2$ represents the distance between the imaging optics and diaphragm plane;
n represents the refractive index of the scanning plate; and
f represents the focal lengths of the structure element of the reference marking.

Figure 6A:
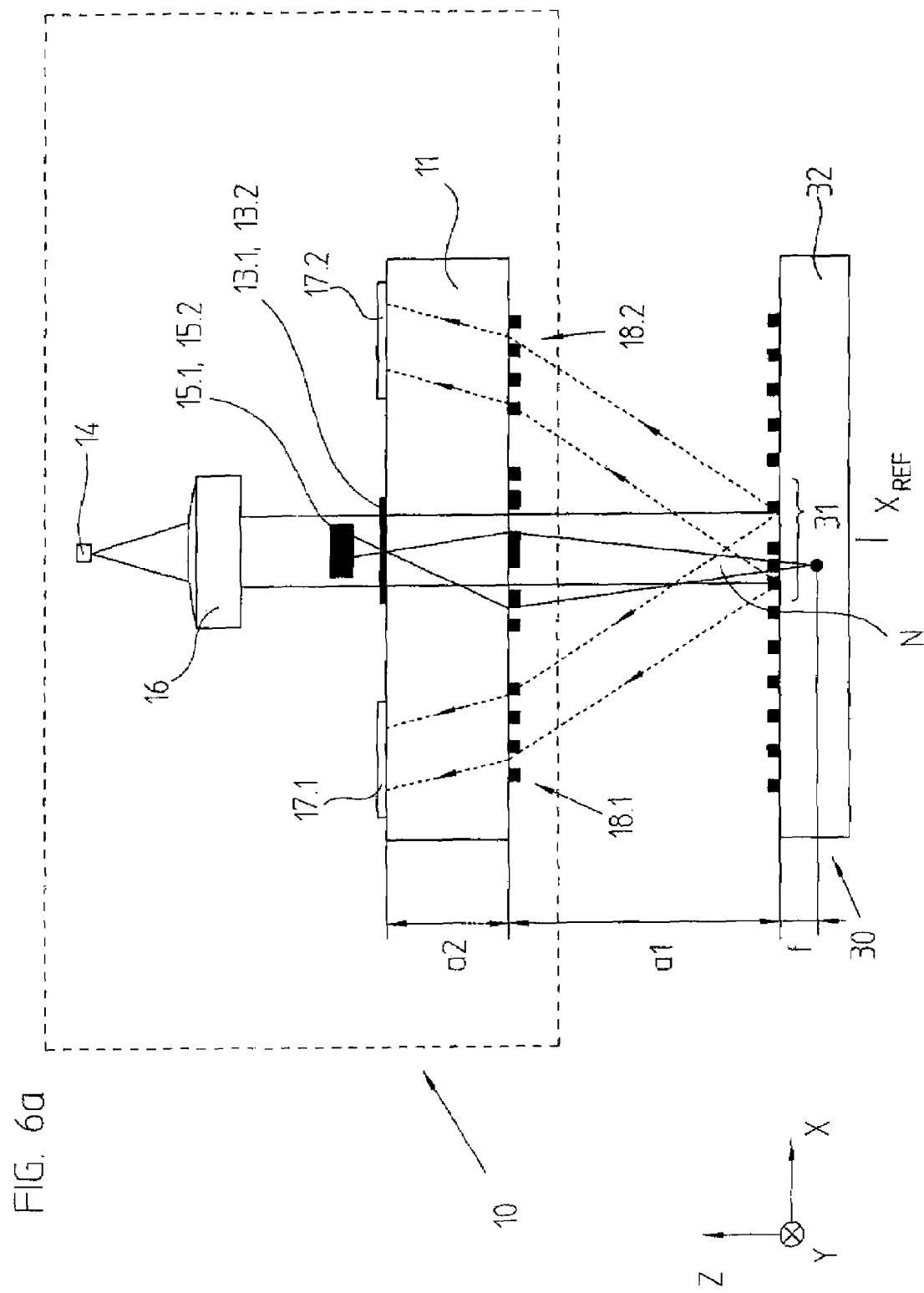
FIG. 6a to 6c are schematic views, analogous to FIG. 1b, with different positions of the neutral point of rotation or with a tilted reflection-measuring graduation.

FIG. 6a schematically shows the situation where neutral point of rotation N is located considerably below the measuring-graduation plane for scanning-related reasons. As illustrated, focal length f of structure elements 31.1, 31.2 of reference marking 31 is selected to equal one half of the distance of neutral point of rotation N from reflection-measuring graduation 30, and imaging optics 12 is adapted to the position of the focal plane.

Figure 6B:
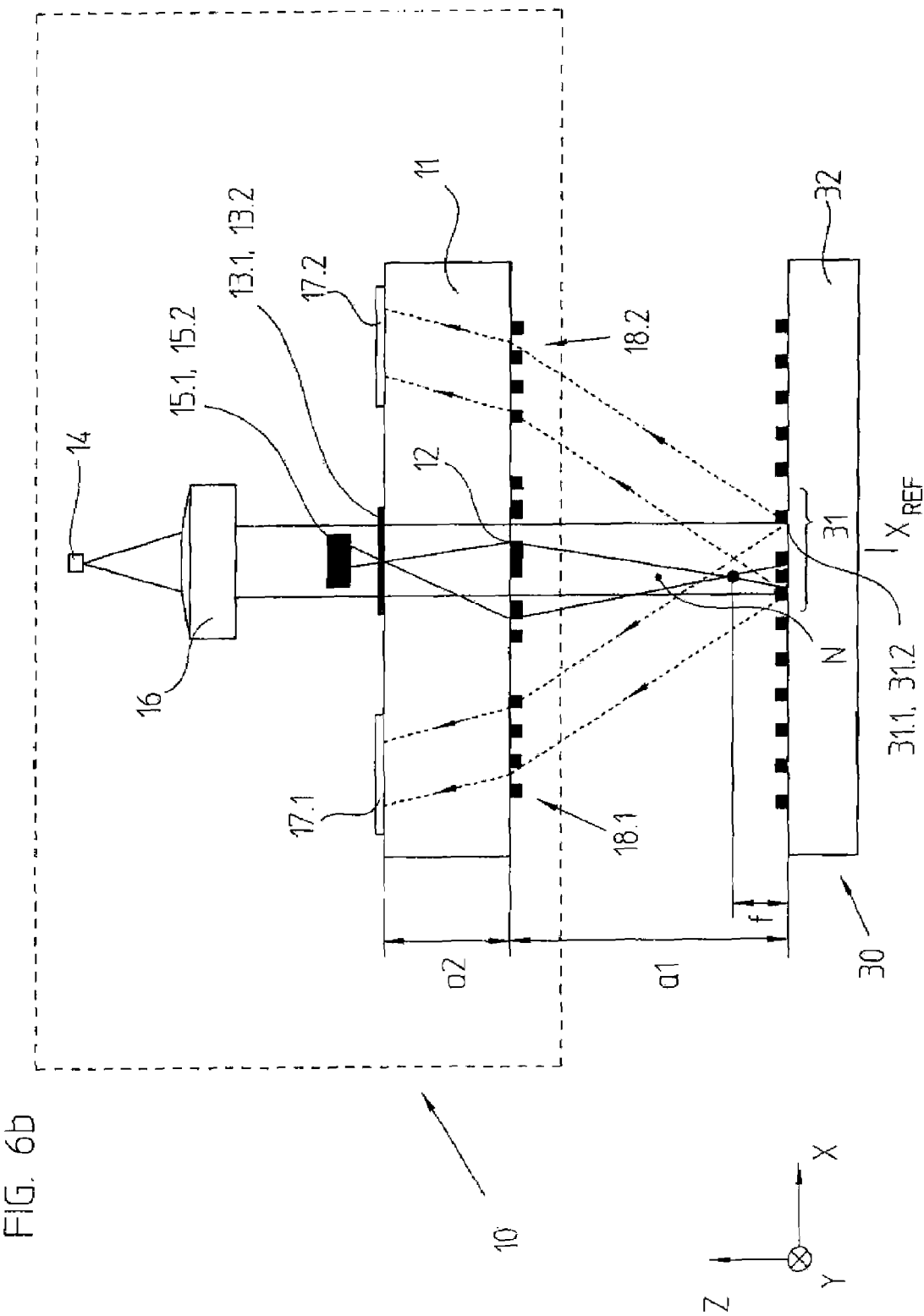

In contrast, FIG. 6b schematically shows the situation where neutral point of rotation N is located considerably above the measuring-graduation plane for scanning-related reasons. As illustrated, focal length f of structure elements 31.1, 31.2 of reference marking 31 is selected to equal one half of the distance of neutral point of rotation N from reflection-measuring graduation 30, and imaging optics 12 is adapted to the position of the focal plane.

Figure 6C:
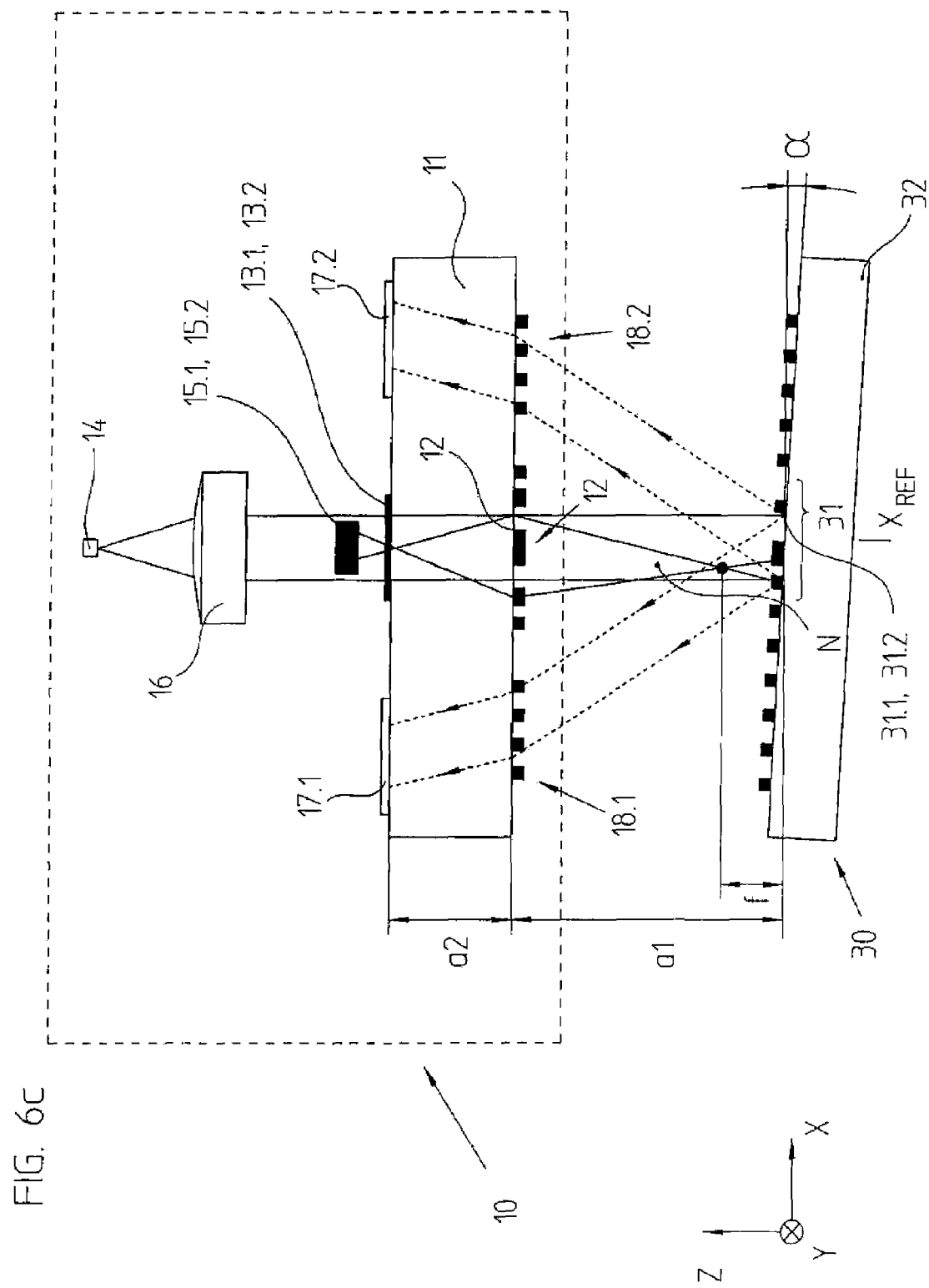

In the situation illustrated FIG. 6b, possible tilting of reflection-measuring graduation 30 about an axis in the y-direction by an angular amount α (cf. FIG. 6c) shifts the focus of imaging optics 12 by 2 fα in linear approximation. This corresponds to the amount of the shift of the incremental signals, i.e., the tilting affects the reference-signal generation and the incremental-signal generation in the same manner.

The arrangement of the reference marking therefore makes it possible to bring the neutral point of rotation of the reference-pulse signal generation in congruence with the neutral point of rotation of the incremental-signal generation. Due to the measures described herein, possible tilting of the reflection-measuring graduation relative to the scanning unit affects both signals in the same manner. For example, those cases where the neutral point of rotation of the incremental-signal generation comes to lie at a considerable distance from the measuring-graduation plane because of the scanning principle, the afore-described approach utilizing the structure elements having a specific optical effect allow the position of the neutral point of rotation of the reference-pulse signal generation to be adapted in an especially advantageous manner.

Furthermore, given appropriate scanning principles, it is also possible that the neutral point of rotation of the incremental-signal generation comes to lie in relatively close proximity to the measuring-graduation plane. In this case, it may be provided that individual sets of structure elements are not provided with the mentioned optical cylinder-lens characteristics, but that a rectangular cross-sectional form is chosen for the structure elements. The mixed arrangement of the sets including the afore-described structure elements having a defined optical effect on the one hand, and the sets of structure elements without such an optical effect on the other hand, makes it possible to shift the neutral point of rotation of the reference-pulse signal generation into the immediate vicinity of the measuring-graduation plane.

Figure 7A:
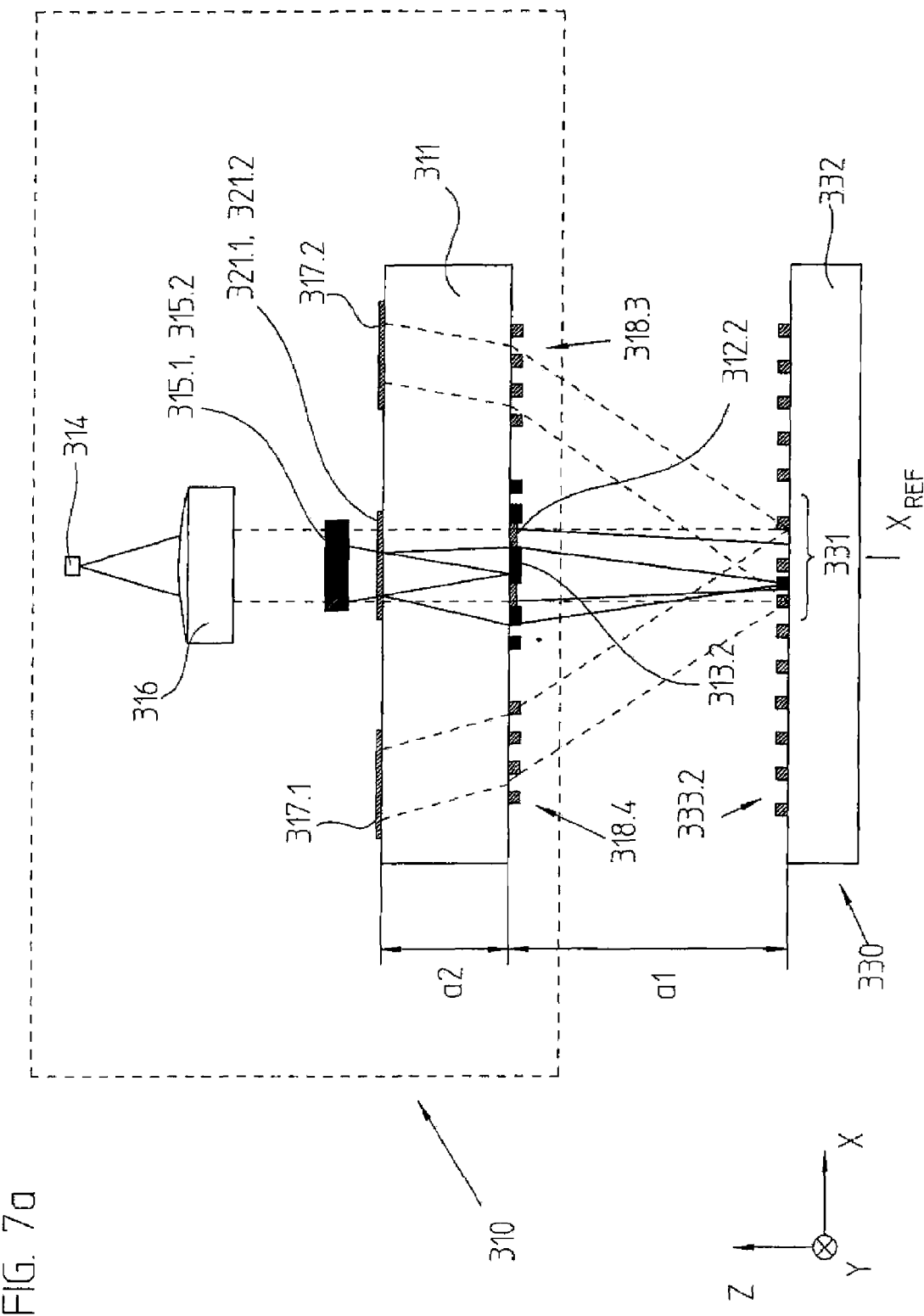
FIG. 7a schematically illustrates partial-scanning beam paths of a position-measuring device according to an example embodiment of the present invention, to describe the generation of reference-pulse signals.
Figure 7B:
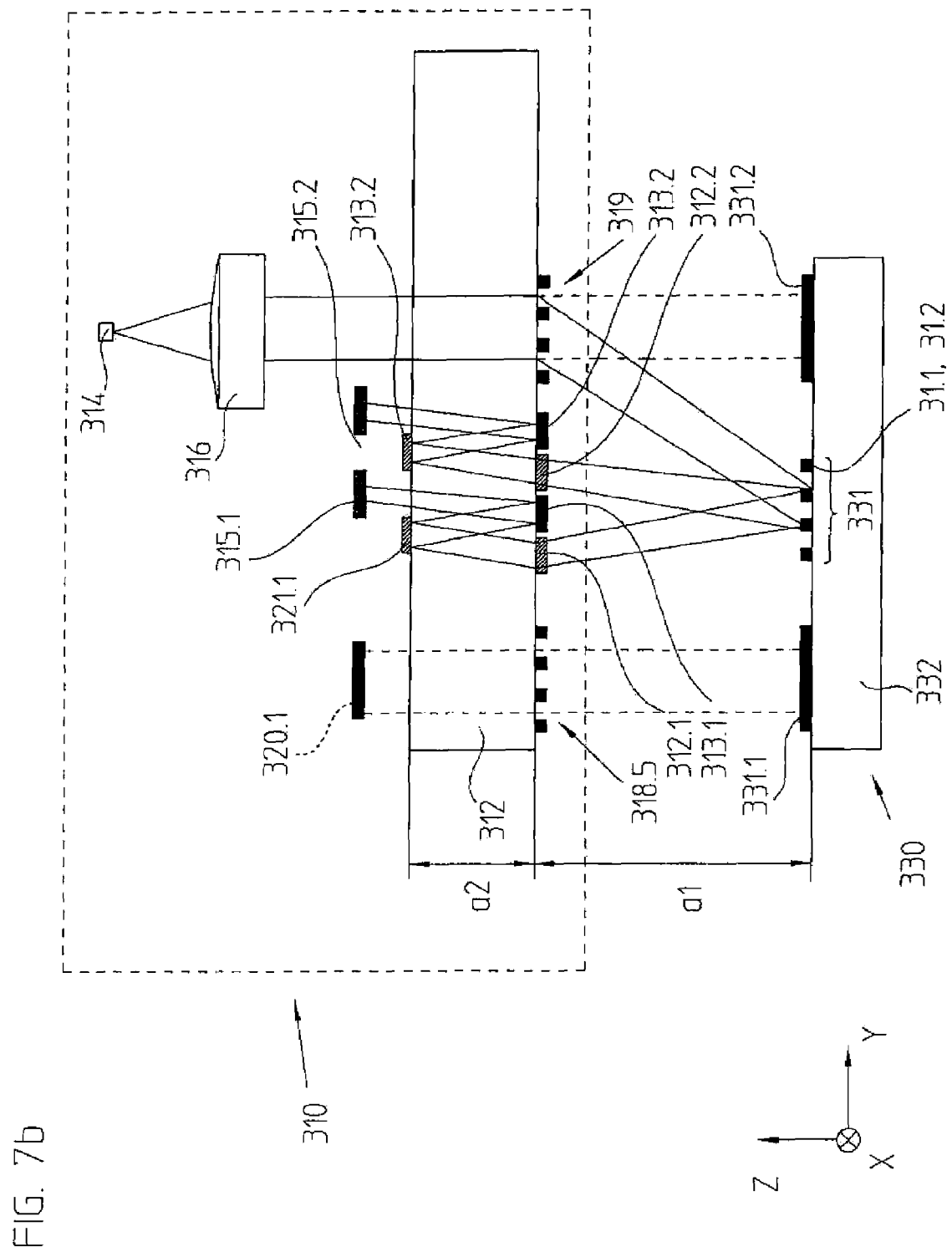
FIG. 7b schematically illustrates partial-scanning beam paths of the position-measuring device illustrated in FIG. 7a, to describe the generation of reference-pulse signals.
Figure 8A:
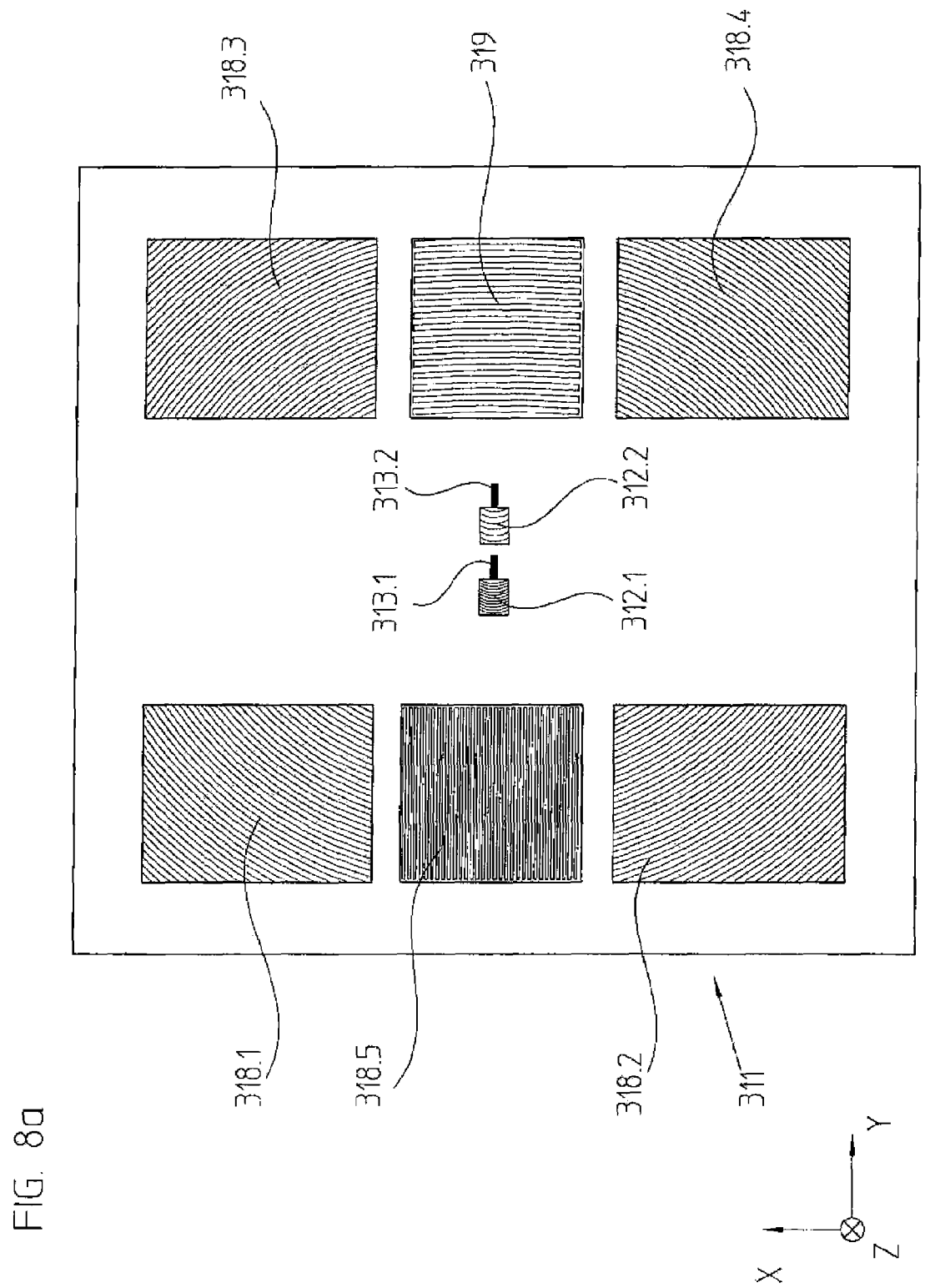
FIG. 8a is a plan view of the underside of the scanning plate of the position-measuring device illustrated in FIGS. 7a and 7b.
Figure 8B:
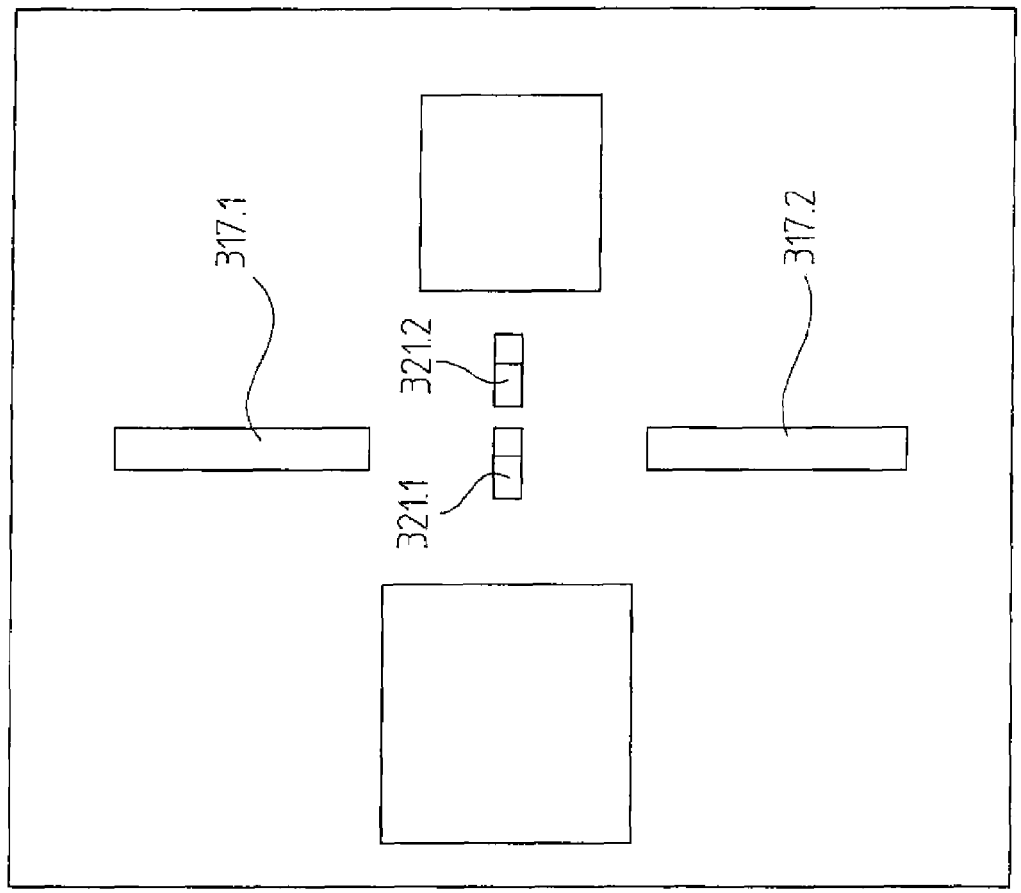
FIG. 8b is a plan view of the topside of the scanning plate of the position-measuring device illustrated in FIGS. 8a and 8b.

In the following text, a position-measuring device according to an example embodiment of the present invention, which differs slightly from the afore-described example embodiment, is described with reference to FIGS. 7a and 7b as well as FIG. 8a and 8b. Analogously to the previous example, FIGS. 7a and 7b show partial scanning-beam paths, and FIGS. 8a and 8b are views of the underside and topside of the scanning plate. In the following, only the particular components or functions thereof that differ from those of the first exemplary embodiment are discussed.

The partial scanning-beam paths indicated by a solid line represent the beam paths that are used to generate the reference-pulse signals. The partial scanning beam paths indicated by the dashed line represent the beam paths that are used to generate the incremental signals.

In contrast to the above-described example embodiment, convergent illumination of reference marking 331 is provided on reflection-measuring graduation 330. Convergent illumination of reference marking 331 may provide advantages inasmuch as the position of the neutral point of rotation of the reference-pulse signal generation will be largely independent from the scanning distance between reflection-measuring graduation 330 and scanning unit 310. In FIG. 7b, the convergent illumination-beam path between splitting grating 319 and reference marking 331 is illustrated. Furthermore, the independence of the position of the neutral point of rotation of the incremental-signal generation from the scanning distance is provided by the selected scanning of incremental graduations 333.1, 333.2.

In the illustrated exemplary embodiment, in order to provide such a convergent illumination of reference marking 331, splitting grating 319 in scanning unit 310 is arranged as an imaging lens in the form of a diffractive beam-splitter element having curved grating lines, as also illustrated in the view of the underside of scanning plate 311 in FIG. 8a.

The arrangement of splitting grating 319 as an imaging lens entails an additional modification in the scanning-beam path in the second exemplary embodiment. It is important, for example, that splitting grating 319 and diaphragm structures 313.1, 313.2 on scanning plate 311 are in precise alignment with each other so that the position of the resulting reference-pulse signals remains unchanged even when the scanning distance is modified. To be able to realize the precise alignment of these components in a technologically simpler manner during the production, diaphragm structures 313.1, 313.2 and splitting grating 319 are disposed on the same side of scanning plate 311 in this exemplary embodiment, in contrast to the above-described exemplary embodiment. FIG. 8a illustrates the underside of scanning plate 311, where in the y-direction, individual diaphragm structures 313.1, 313.2 are disposed adjacent to the components of imaging optics 312.1, 312.2.

As an alternative, the diaphragm structures and the splitting grating may also be mounted on the top surface of the scanning plate.

In the present example, to allow diaphragm structures 313.1, 313.2 to be situated on the underside of scanning plate 311, in contrast to the previous example, reflector elements 321.1, 321.2 are disposed on the top surface of scanning plate 311 in addition, as illustrated in FIG. 8b, for instance. With regard to the scanning-beam path, this means that—as illustrated in FIG. 7b—the partial beams of rays, reflected by reference marking 331 in the direction of scanning unit 310, initially are imaged into the plane of diaphragm structures 313.1, 313.2 on the underside of scanning plate 311 by imaging optics 312.1, 312.2, which includes two parts in this example, via additional reflector elements 321.1, 321.2. Reflector elements 321.1, 321.2 are illustrated in the view of the topside of scanning plate 311 in FIG. 8b. The back reflection in the direction of detector elements 315.1, 315.2 for the generation of the reference pulses takes place via diaphragm structures 313.1, 313.2 on the underside of scanning plate 311. Because of this beam path, diaphragm structures 313.1, 313.2 in this exemplary embodiment are not arranged as light-transmitting/opaque structures, but as reflective/non-reflective structures.

The scanning-beam path for the generation of reference-pulse signals, which is slightly modified in comparison with the above-described exemplary embodiment, requires a further modification. For example, it can be gathered from FIG. 7b that, in addition to the imaging optical effect, a transversal deflection effect in the y-direction via imaging optics 312.1 or 312.2 is provided as well. This is able to be provided if each imaging optics 312.1, 312.2 is arranged as grating-lens structure, as schematically illustrated in the view of the underside of scanning plate 311 in FIG. 8a.

Apart from the above-described modifications, the generation of the reference-pulse signals and the incremental pulse signals in this exemplary embodiment functions in the same manner as in the example discussed previously.

Two additional exemplary embodiments of a position-measuring device are described, in which, compared to the two above-described exemplary embodiments, additional measures are provided to compensate for specific fault influences. Errors in the generation of the reference-pulse signal may arise if an undesired change occurs in the angle at which the beam of rays coming from the light source propagates relative to the scanning plate in the direction of the reference marking.

Figure 9A:
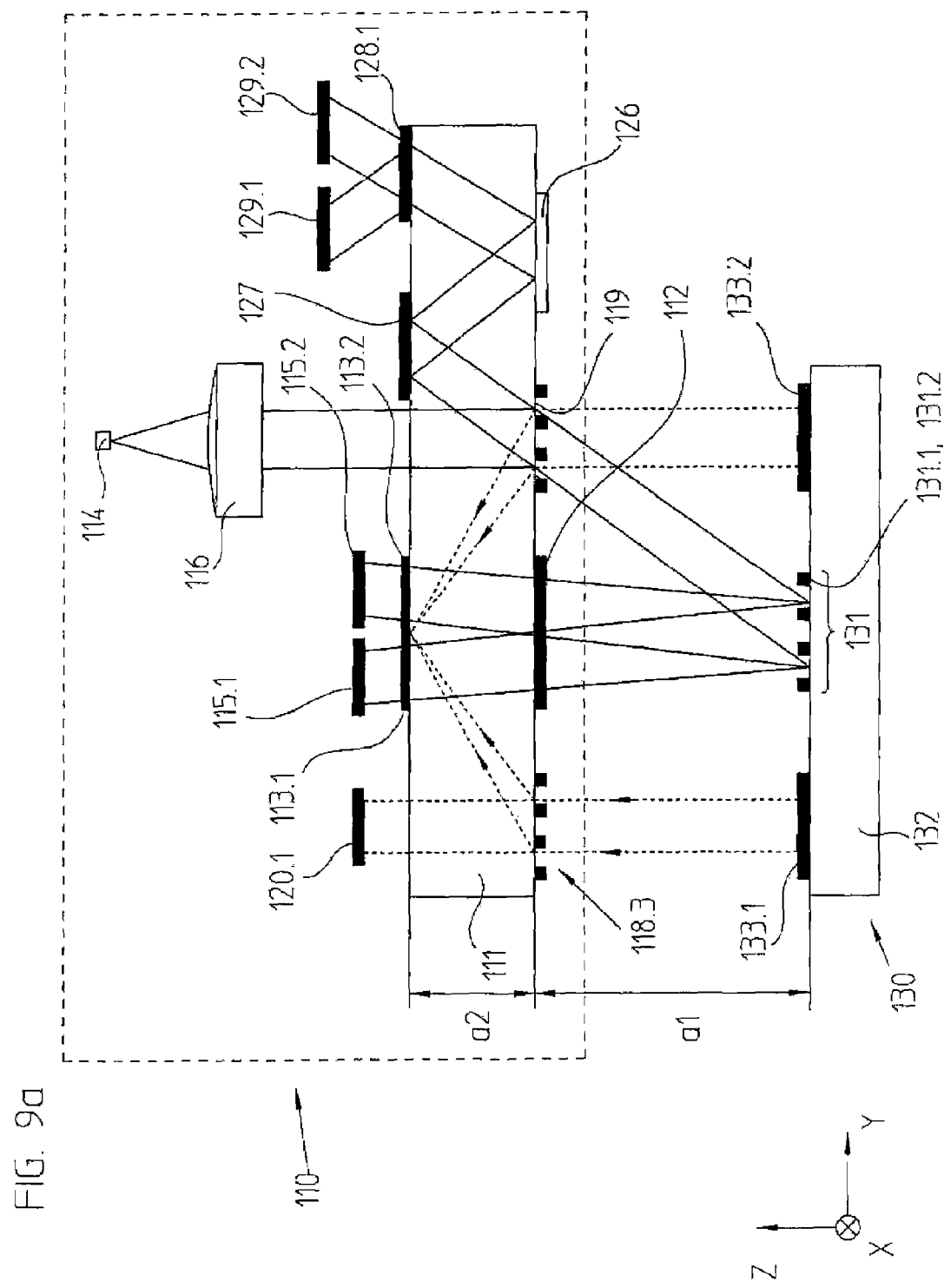
FIG. 9a schematically illustrates a portion of the scanning-beam path of a position-measuring device, which includes an additional correction device to correct the beam tilt drift.
Figure 9C:
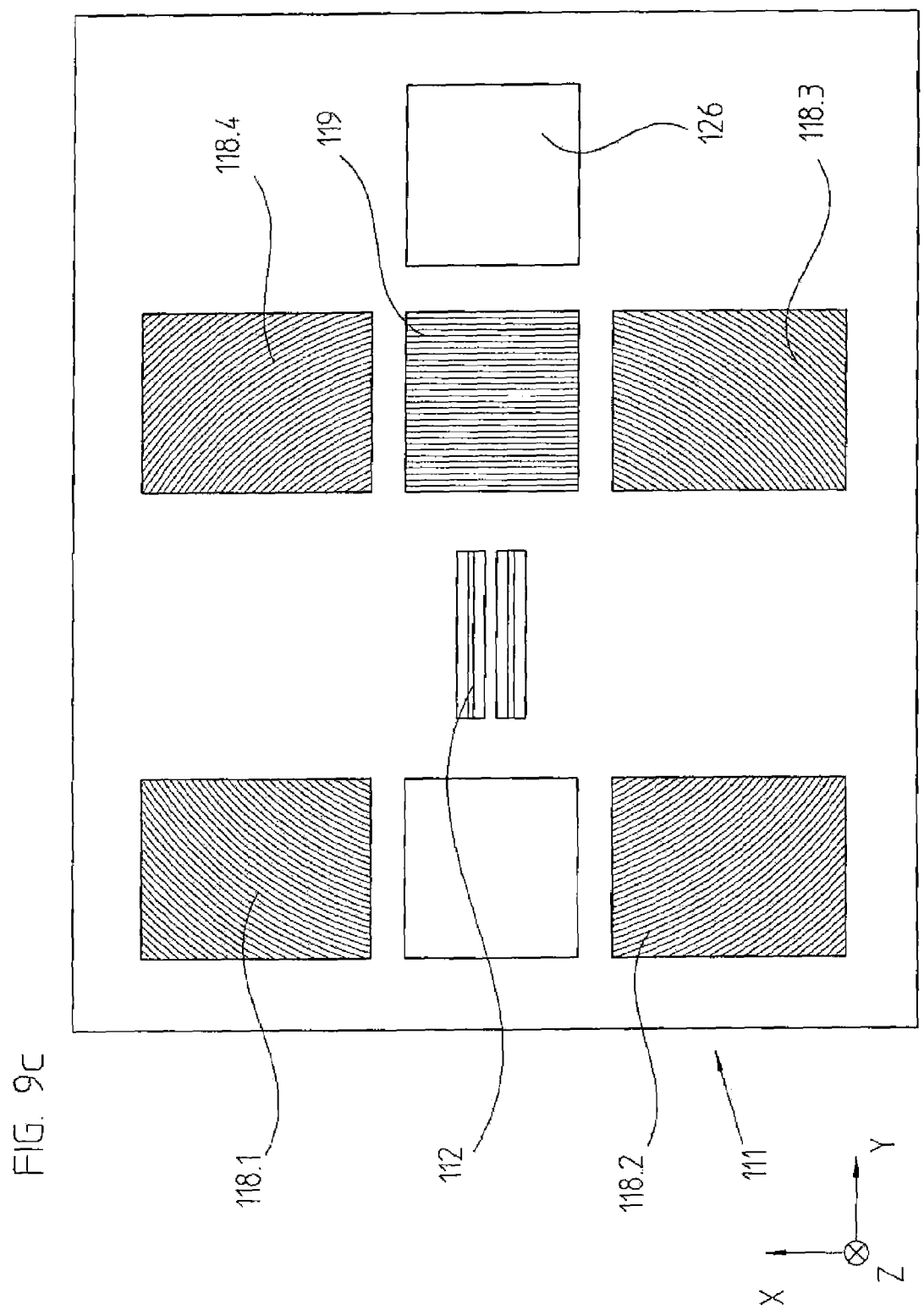
Figure 10:
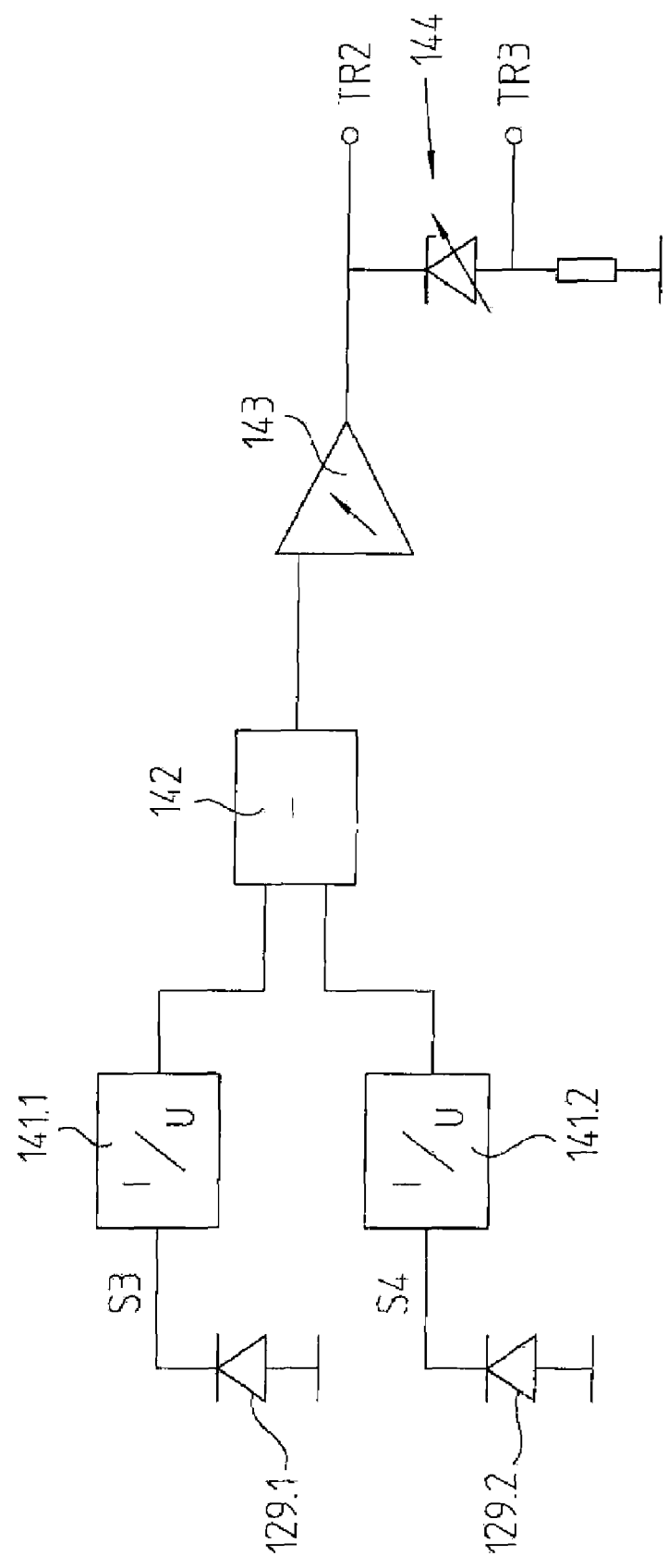
FIG. 10 schematically illustrates the circuit system for processing auxiliary signals to correct the beam tilt drift.

Referring to FIGS. 9a to 9c as well as FIG. 10, a further example embodiment is described, which, in addition to the aforementioned components for the generation of reference pulses and incremental signals, also includes a correction device on the side of the scanning unit, which allows the generation of auxiliary signals. These auxiliary signals constitute a measure for the previously mentioned, fault-causing angular change and are able to be analyzed with a view towards eliminating errors of this type. The following description focuses only on the generation and utilization of the auxiliary signals. As far as the scanning principle is concerned, the reference-pulse generation and the incremental-signal generation utilize the same principle as the above-described exemplary embodiment.

As illustrated in FIG. 9a, the correction device is arranged in the region of the right part of scanning plate 111 of scanning unit 110 and provided with reference numerals 126, 127, 128.1, 129.1, 129.2. Analogously to the first described exemplary embodiment, FIGS. 7b and 7c show plan views of the topside and underside of scanning plate 111 including correction device 127, 128.1, 128.2 and 126.

For the generation of the auxiliary signals, according to FIG. 7a, a partial beam of rays is split off via splitting grating 119 from the beam of rays arriving from light source 114, which propagates in the direction of a reflecting Fresnel lens 127 disposed on the top surface of scanning plate 111. Fresnel lens 127 is optically dimensioned such that its image-side focal point is located in the plane of splitting grating 119. To generate the auxiliary signals, Fresnel lens 127 deflects the partial beam of rays in the direction of a reflector element 126 on the underside of scanning plate 111, which is arranged in the focal plane of Fresnel lens 127. From reflector element 126, the partial beams of rays are deflected back in the direction of the topside of the scanning plate where two periodic grating structures 128.1, 128.2 having different grating constants are disposed perpendicular with respect to one another. Two auxiliary-signal detector elements 129.1, 129.2, which detect the partial beams of rays deflected by grating structures 128.1, 128.2, are connected downstream therefrom.

As illustrated in FIG. 8, both auxiliary-signal detector elements 129.1, 129.2 are differentially interconnected via a subtraction element 142. The resulting difference signal is conveyed as an auxiliary signal to an adjustable amplifier element 143 at whose output trigger threshold TR2 or, via adjustment element 144, trigger threshold TR3 results. Adjustment element 144 may be arranged as controllable Zener diode, for example, with whose aid a constant voltage drop is set. In this manner, the width of the reference-pulse signal remains unchanged and only its length is post-controlled.

Figure 5:
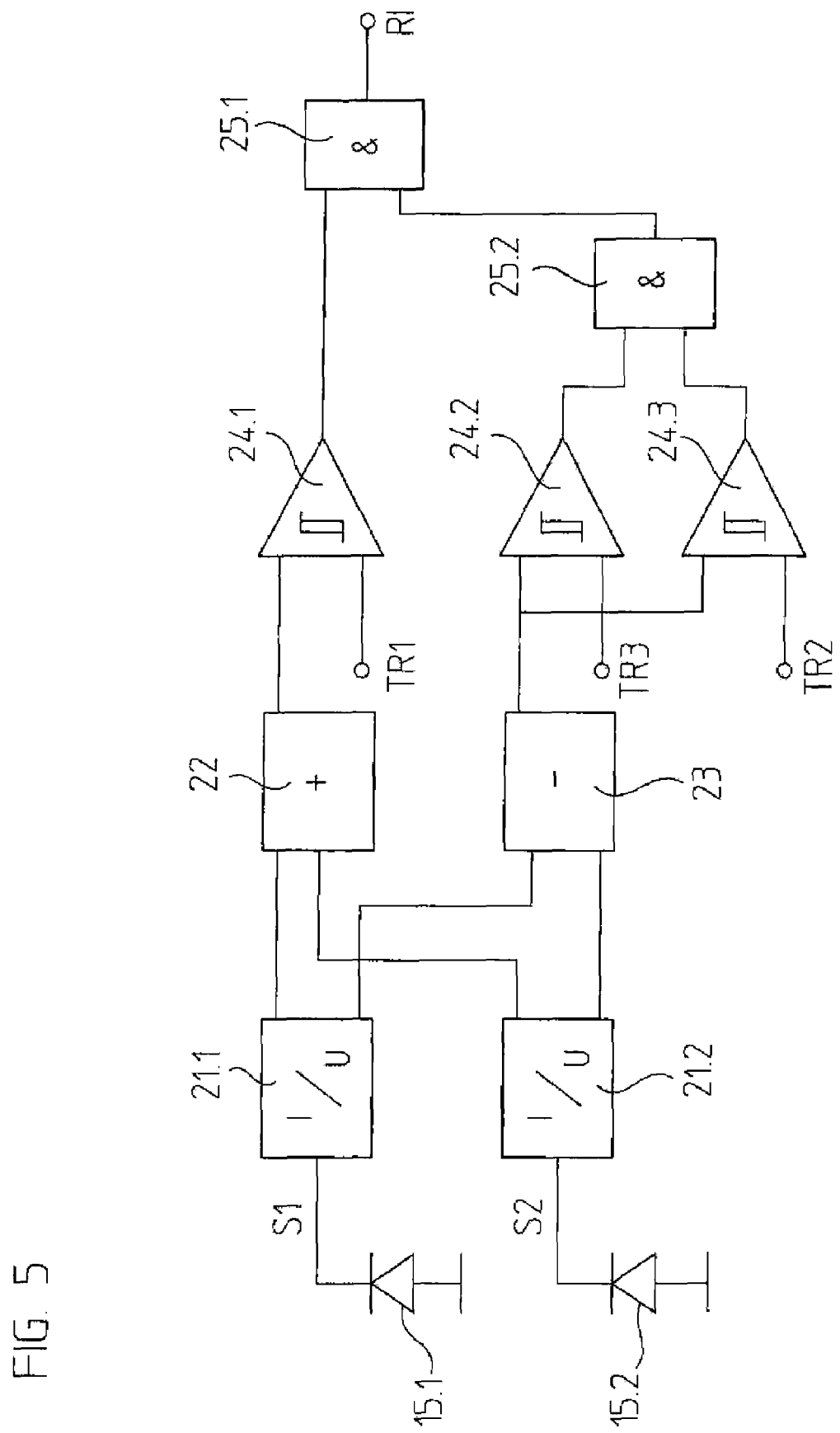
FIG. 5 schematically illustrates a circuit system for processing the various signals and for generating the reference-pulse signal illustrated in FIGS. 4a to 4c.

Trigger thresholds TR2, TR3 generated in this manner may be utilized as reference signals or trigger thresholds of comparators 24.2, 24.3 in the circuit system illustrated in FIG. 5.

In this exemplary embodiment, a possible change in the angle of incidence of the beams of rays coming from light source 114 in measuring direction x causes a change in the position of the generated image in the transition region of grating structures 128.1, 128.2. As a consequence thereof, the generated difference signal changes as well, which may therefore serve as a measure for such an angular change.

A further example embodiment of a device having a second variant of a correction device for the generation of auxiliary signals is described with reference to FIGS. 11a to 11c.

Figure 11A:
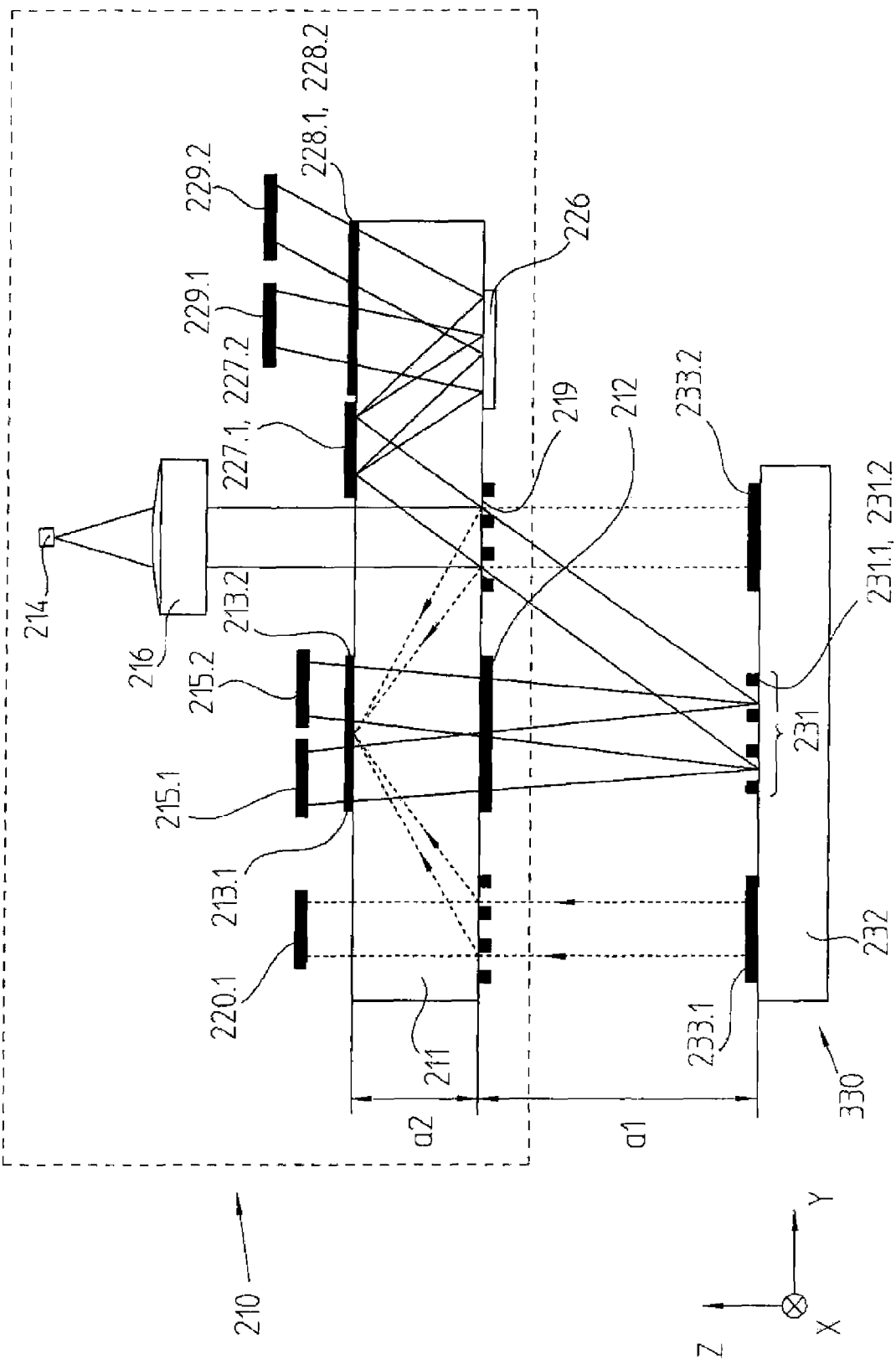
FIG. 11a schematically illustrates a portion of the scanning-beam path of a position-measuring device, which includes an alternative correction device for correcting the beam tilt drift.
Figure 11B:
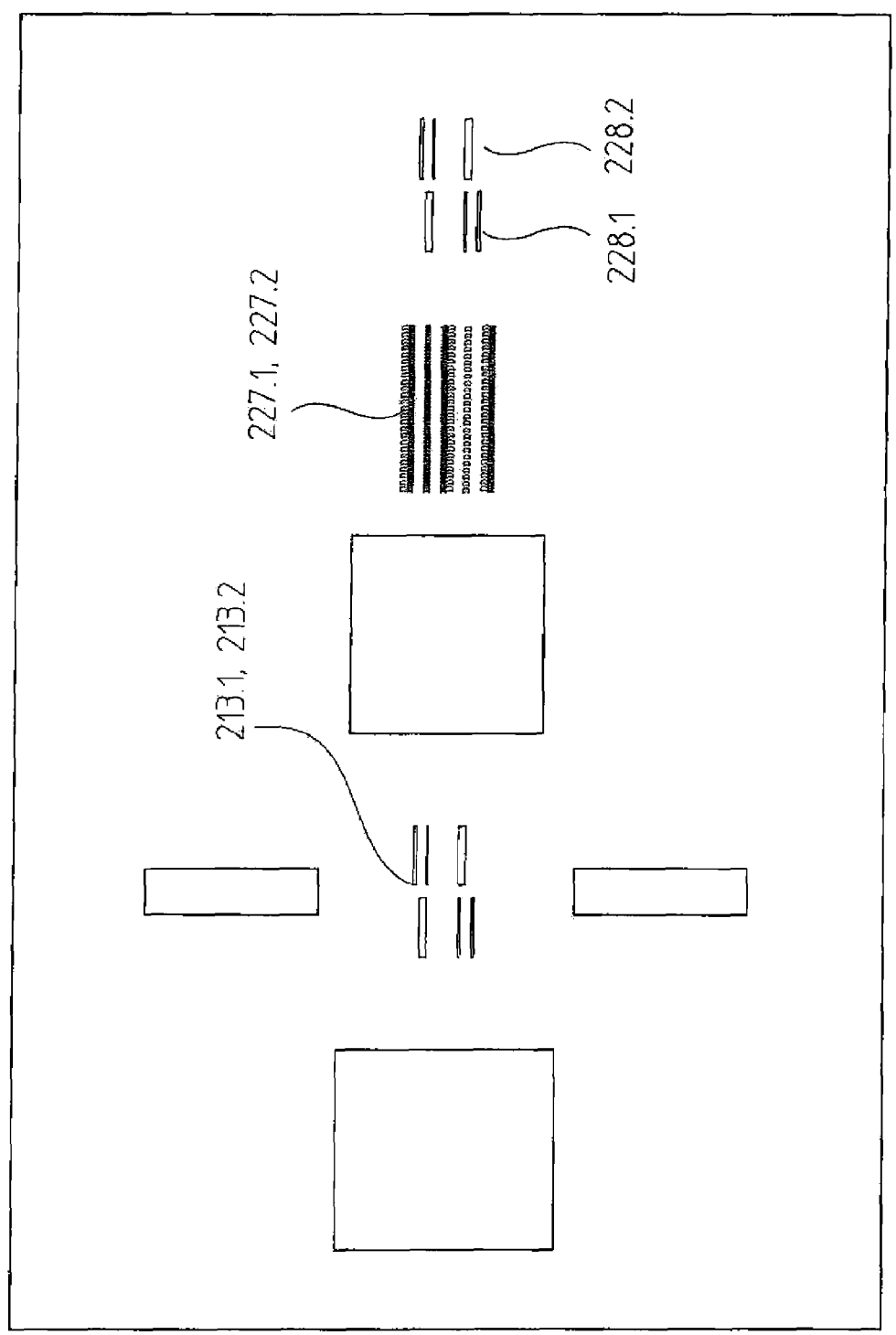
Figure 11C:
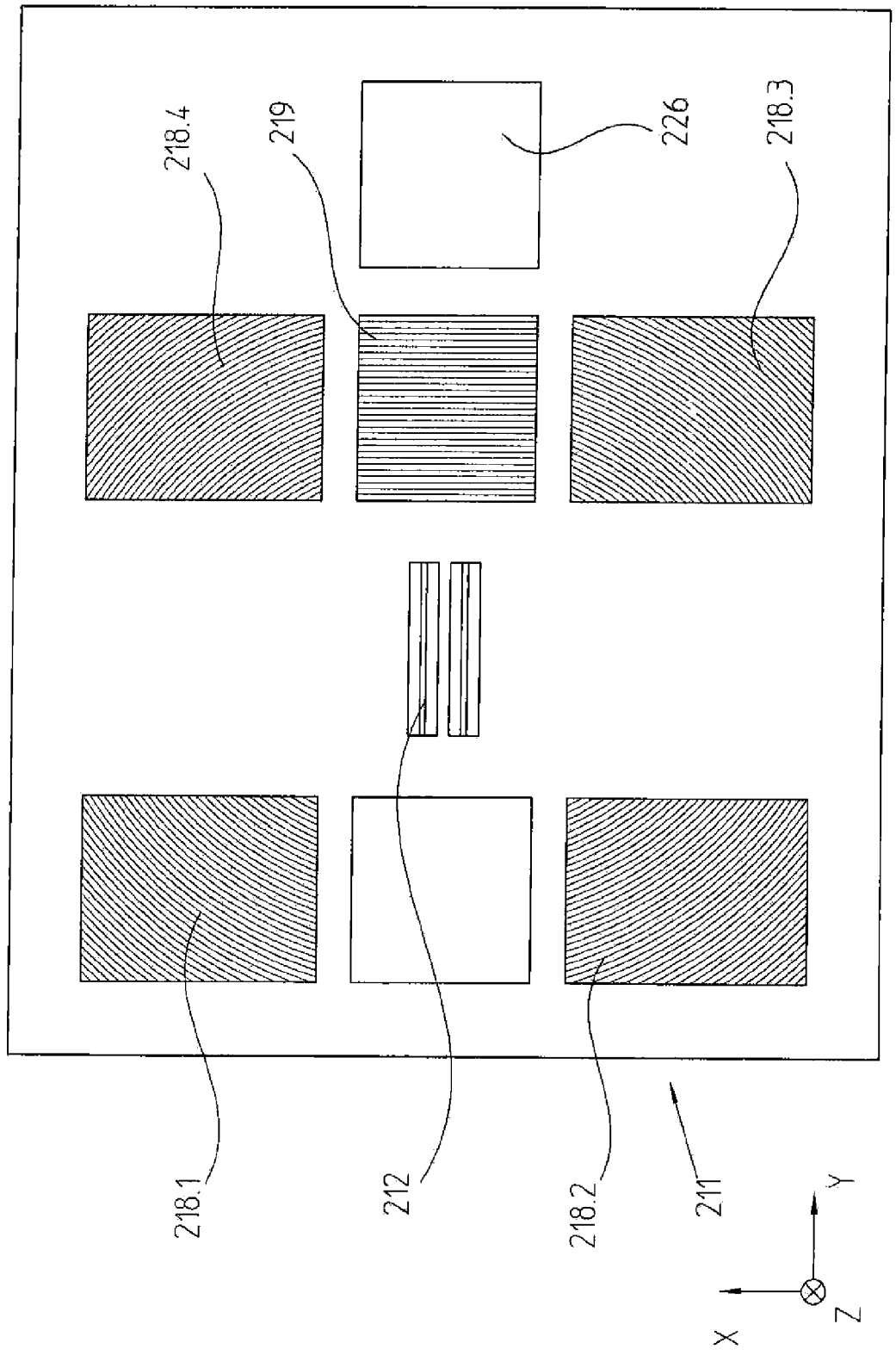

In FIG. 11a, the various components of the correction device are arranged in the region of the right part of scanning plate 211 of scanning unit 210, where they are provided with reference numerals 226, 227.1, 227.2, 228.1, 229.1, 129.2. As in the third example, FIGS. 11b and 11c, analogously to the first described example embodiment, show plan views of the topside and underside of scanning plate 211 including correction device 227.1, 227.2, 228.1, 228.2 and 226.

According to FIG. 11*a*, as in the previous example, a partial beam of rays is split off from the beam of rays arriving from light source 214 via splitting grating 219 in order to generate the auxiliary signals. This partial beam of rays falls on a grating-lens structure 227.1, 227.2 arranged on the side of scanning plate 211 that faces away from reflection-measuring graduation 330. With regard to its geometrical and optical configuration, it corresponds to reference marking 231 on the reflection-measuring graduation and has a focal point in the plane of splitting grating 219. From grating-lens structure 227.1, 227.2 the partial beams of rays are reflected back in the direction of a reflector element 226, which is disposed in the focal point of grating-lens-structure 227.1, 227.2 on the underside of scanning plate 211. The partial beams of rays reflected from there encounter two diaphragm structures 228.1, 228.2 having a plurality of diaphragm openings, which are disposed on the top surface of scanning plate 211. Two post-connected auxiliary-signal detector elements 229.1, 229.2 detect the light transmitted through the diaphragm openings of diaphragm structures 228.1, 228.2. As in the previous example, the signals resulting at the outputs of auxiliary-signal detector elements 229.1, 229.2 are interconnected to form a difference signal, which is used as an auxiliary signal to set trigger thresholds TR2, TR3. The same circuit system described above with reference to FIG. 10 may be used for this purpose.

This variant of correction device is able to detect and correct the aforementioned possible fluctuation in the angle of incidence of the beams of rays on the reference marking.

Besides the described exemplary embodiments, there are other possible arrangements within the spirit and scope hereof.

For example, instead of the oblique incidence of the illuminating beams of rays from splitting grating 19 on reference marking 31, as illustrated in FIG. 1*b*, it is also possible to provide an illumination of reference marking 31 that has a perpendicular orientation. Such a variant provides certain advantages with regard to the position of the reference-pulse signals in the event of tilting of the scanning unit and the reflection-measuring graduation in certain directions.

As mentioned above, it is also possible to arrange both linear and rotary measuring systems on the basis of the considerations described herein.

What is claimed is:

1. A position-measuring device for generating a reference-pulse signal at at least one reference position, comprising:
   a scanning unit; and
   a reflection-measuring graduation displaceable relative to the scanning unit in at least one measuring direction;
   wherein the scanning unit, to generate the reference-pulse signal, includes a plurality of optical elements including at least one imaging optics and at least two diaphragm structures disposed in a diaphragm plane and having a plurality of diaphragm openings, a light source and at least two detector elements being assigned to the scanning unit;
   wherein the reflection-measuring graduation includes a reference marking at the at least one reference position;
   wherein the reference marking includes at least one set of first structure elements disposed in a plane of the reflection measuring graduation, perpendicular to the measuring direction, periodically at a first transversal periodicity, the reference marking including at least one set of second structure elements disposed in the plane of the reflection measuring graduation, perpendicular to the measuring direction, periodically at a second transversal periodicity, the first transversal periodicity and the second transversal periodicity differing from each other; and
   wherein the structure elements are arranged as diffractive structure elements which are configured to optically act, in the measuring direction, as a cylinder lens having a specific focal length and, perpendicular to the measuring direction, act as a deflecting grating having one of (a) the first transversal periodicity and (b) the second transversal periodicity.

2. The position-measuring device according to claim 1, wherein, in the measuring direction, the structure elements have one of (a) a virtual and (b) a real focal point at the focal-length distance from the reflection-measuring graduation.

3. The position-measuring device according to claim 1, wherein the focal length of the structure elements corresponds to one half of a distance of a neutral point of rotation from the reflection-measuring graduation, and the neutral point of rotation corresponds to a point about which tilting of one of (a) the scanning unit and (b) the reflection-measuring graduation is possible without resulting in a position error.

4. The position-measuring device according to claim 1, wherein the imaging optics in the scanning unit is dimensioned such as to image an image-side focal plane of the structure elements into the diaphragm plane.

5. The position-measuring device according to claim 1, wherein the reference marking includes a plurality of sets of first and second structure elements disposed in parallel and mirror symmetry with an axis of symmetry perpendicular to the measuring direction in the measuring-graduation plane, structure elements having the different transversal periodicity arranged opposite each other in mirror symmetry.

6. The position-measuring device according to claim 1, wherein individual structure elements have a cross-sectional form that includes two straight boundary lines that extend parallel in a transversal extension direction and two parallel boundary lines that curve in a longitudinal extension.

7. The position-measuring device according to claim 1, wherein:
   the reflection-measuring graduation includes at least one periodic incremental graduation extending in the measuring direction; and
   the scanning unit includes a scanning device configured to generate periodic incremental signals in the event of a relative movement of the reflection-measuring graduation and the scanning unit.

8. The position-measuring device according to claim 7, wherein the focal length of the structure elements is selected such that an adaptation with regard to a position of a neutral point of rotation of the reference-pulse signal generation to a position of a neutral point of rotation of an incremental-signal generation is implemented, the neutral point of rotation of the reference-pulse signal generation corresponding to a point about which tilting of one of (a) the scanning unit and (b) the reflection-measuring graduation is possible without causing a position error.

9. The position-measuring device according to claim 1, wherein a positional placement of the diaphragm openings of the two diaphragm structures in the measuring direction is adapted to placement of the structure elements of the reference marking.

10. The position-measuring device according to claim 1, wherein the imaging optics is arranged as lens array having a plurality of individual lenses.

11. The position-measuring device according to claim 1, wherein the scanning unit includes a scanning plate on which the diaphragm structures and the imaging optics are arranged.

12. The position-measuring device according to claim 11, wherein the diaphragm structures are arranged on a side of the scanning plate facing away from the reflection-measuring graduation, the diaphragm structures arranged as light-transmitting/opaque structures, the imaging optics arranged on a side of the scanning plate facing the reflection-measuring graduation.

13. The position-measuring device according to claim 11, wherein the diaphragm structures and the imaging optics are arranged on a side of the scanning plate facing the reflection-measuring graduation, the diaphragm structures arranged as reflective/non-reflective structures.

14. The position-measuring device according to claim 11, wherein a splitting grating is arranged on the scanning plate, via which a beam of rays arriving from the light source is split up into a partial beam of rays to generate the reference-pulse signals, and into a partial beam of rays to generate incremental signals.

15. The position-measuring device according to claim 14, wherein the splitting grating is configured to provide convergent illumination of the reference marking on the reflection-measuring graduation.

16. The position-measuring device according to claim 15, wherein the splitting grating is arranged as a diffractive beam-splitter device having curved grating lines.

17. The position-measuring device according to claim 15, wherein, on a side of the scanning plate that is oriented to face away from the reflection-measuring graduation, at least one reflector element is arranged, the reflector element configured to reflect an incident beam of rays back in a direction of a side of the scanning plate facing the reflection-measuring graduation.

18. The position-measuring device according to claim 14, wherein the splitting grating is arranged on a side of the scanning plate facing the reflection-measuring graduation.

19. The position-measuring device according to claim 7, wherein an addition and a subtraction device is arranged downstream from the two detector elements, and arranged downstream of the addition and subtraction device is a plurality of comparator devices having individually defined trigger thresholds interconnected such that a reference-pulse signal having a width results on an output side that corresponds to a width of the incremental signals.

20. The position-measuring device according to claim 1, wherein the scanning unit includes a correction device configured to generate auxiliary signals that represent a measure for a change in an angle relative to a scanning plate, at which a beam of rays arriving from the light source propagates in a direction of the reference marking.

21. The position-measuring device according to claim 20, wherein the correction device includes:
  a Fresnel lens, disposed on a side of the scanning plate facing away from the reflection-measuring graduation, having a focal point located in a plane of a splitting grating and which is acted upon by a partial beam of rays which is split off from an incident beam of rays by the splitting grating;
  a reflector device arranged in the focal point of the Fresnel lens on a side of the scanning plate facing the reflection-measuring graduation;
  two periodic grating structures arranged perpendicular to one another on the side of the scanning plate facing away from the reflection-measuring graduation;
  two auxiliary-signal detector devices, differentially interconnected via a subtraction element, a resulting difference signal usable as the auxiliary signal to set trigger thresholds.

22. The position-measuring device according to claim 20, wherein the correction device includes:
  a grating lens structure arranged on a side of the scanning plate facing away from the reflection-measuring graduation and which corresponds to the reference marking, the grating lens structure having a focal point located in a plane of a splitting grating, and which is acted upon by a partial beam of rays that is split off from an incident beam of rays by the splitting grating;
  a reflector device arranged in the focal point of the grating-lens structure on a side of the scanning plate facing the reflection-measuring graduation;
  two diaphragm structures arranged on the side of the scanning plate facing away from the reflection-measuring graduation;
  two auxiliary-signal detector devices interconnected differentially, a resulting difference signal usable as the auxiliary signal to set trigger thresholds.

\* \* \* \* \*